(12) United States Patent
Guo

(10) Patent No.: US 12,143,525 B2
(45) Date of Patent: Nov. 12, 2024

(54) ELECTRONIC DEVICE WITH CURVED SURFACE STRUCTURE DISPLAY

(71) Applicant: Honor Device Co., Ltd., Shenzhen (CN)

(72) Inventor: Renwei Guo, Shenzhen (CN)

(73) Assignee: HONOR DEVICE CO, LTD., Shenzhen (CN)

( * ) Notice: Subject to any disclaimer, the term of this patent is extended or adjusted under 35 U.S.C. 154(b) by 0 days.

(21) Appl. No.: 17/775,371

(22) PCT Filed: Oct. 29, 2021

(86) PCT No.: PCT/CN2021/127636
§ 371 (c)(1),
(2) Date: Jun. 2, 2022

(87) PCT Pub. No.: WO2022/111211
PCT Pub. Date: Jun. 2, 2022

(65) Prior Publication Data
US 2024/0163357 A1    May 16, 2024

(30) Foreign Application Priority Data

Nov. 26, 2020  (CN) .......................... 202011347757.X

(51) Int. Cl.
*H04M 1/02* (2006.01)
(52) U.S. Cl.
CPC ...... *H04M 1/0269* (2022.02); *H04M 2250/22* (2013.01); *H04M 2250/52* (2013.01)

(58) Field of Classification Search
CPC .. H04M 1/0269; H04M 1/185; H04M 1/0266; H04M 1/026; H04M 1/0268; H04M 2250/22; H04M 2250/52; G06F 1/1652
See application file for complete search history.

(56) References Cited

U.S. PATENT DOCUMENTS

| 9,989,792 B2 | 6/2018 | Hao et al. |
| 10,248,233 B2 | 4/2019 | Cheng |

(Continued)

FOREIGN PATENT DOCUMENTS

| CN | 104199206 A | 12/2014 |
| CN | 106843386 A | 6/2017 |

(Continued)

*Primary Examiner* — Angelica Perez
(74) *Attorney, Agent, or Firm* — Conley Rose, P.C.

(57) ABSTRACT

The present application provides an electronic device, including a cover plate, a display screen, and a support, where the cover plate and the display screen are stacked and disposed around the support, the cover plate includes a first region and a second region, the second region is located between an edge of the cover plate and the first region, the display screen is located between the first region and the support, elastic convex portions are disposed between the second region and the support, and the elastic convex portion each elastically abut between the second region and the support. In the present application, through the arrangement of the elastic convex portions between the second region of the cover plate and the support, a problem that the support impacts on the cover plate in a process of assembling the electronic device is resolved, and an assembly yield of the electronic device is improved.

20 Claims, 14 Drawing Sheets

(56) References Cited

U.S. PATENT DOCUMENTS

| | | |
|---|---|---|
| 11,327,350 B2 | 5/2022 | Luo |
| 11,947,205 B2 | 4/2024 | Su et al. |
| 2014/0265821 A1 | 9/2014 | Malon et al. |
| 2018/0196537 A1* | 7/2018 | Cheng .................... H04M 1/02 |
| 2018/0199116 A1 | 7/2018 | Zhou et al. |

FOREIGN PATENT DOCUMENTS

| | | |
|---|---|---|
| CN | 107797325 A | 3/2018 |
| CN | 207251695 U | 4/2018 |
| CN | 108769320 A | 11/2018 |
| CN | 110049161 A | 7/2019 |
| CN | 110417943 * | 11/2019 |
| CN | 110417943 A | 11/2019 |
| CN | 210609267 U | 5/2020 |
| CN | 210725614 U | 6/2020 |
| CN | 111429795 A | 7/2020 |
| CN | 210986180 U | 7/2020 |
| CN | 111599268 A | 8/2020 |

\* cited by examiner

ELECTRONIC DEVICE WITH CURVED SURFACE STRUCTURE DISPLAY

CROSS-REFERENCE TO RELATED APPLICATIONS

This application is a U.S. National Stage of International Application No. PCT/CN2021/127636 filed on Oct. 29, 2021, which claims priority to the Chinese Patent application Ser. No. 20/201,1347757.X, filed with the China National Intellectual Property Administration on Nov. 26, 2020, both of which are incorporated herein by reference in their entireties.

TECHNICAL FIELD

The present application relates to an assembly structure of a display screen, and in particular, to an electronic device including a display screen with a curved surface structure.

BACKGROUND

At present, a display screen with a curved surface structure is widely used in electronic products. The display screen with a curved surface structure may be a 360° wrap-around display screen, or may be a display screen including a flat display surface and curved display surfaces located on two sides of the flat display surface. The display screen with a curved surface structure (such as a large-curvature display screen) has bending characteristics, thereby effectively increasing a display area and bringing good user experience.

In a design of the display screen with a curved surface structure, a support of a middle frame may impact on the display screen and a cover plate in a process of assembling and aligning the support of the middle frame with the display screen, thereby affecting display quality of the display screen.

Therefore, how to prevent the support of the middle frame from impacting on the cover plate should be the research and development direction of the industry.

SUMMARY

The present application provides an electronic device, so that a support of a middle frame is prevented from impacting on a display screen and a cover plate in an assembly process, and an assembly yield of the electronic device is improved.

According to a first aspect, the present application provides an electronic device, including a cover plate, a display screen, and a support, where the cover plate and the display screen are stacked and disposed around the support, the cover plate includes a first region and second regions, each of the second regions is located between an edge of the cover plate and the first region, the display screen is located between the first region and the support, elastic convex portions are disposed between the second region and the support, and the elastic convex portion each elastically abut between the second region and the support.

In the present application, through the arrangement of the elastic convex portions between the second region of the cover plate and the support, a problem that the support impacts on the display screen and the cover plate in the process of assembling the electronic device is resolved. Specifically, when the electronic device is assembled, alignment between the support and the cover plate needs to be adjusted, and the problem that the support impacts on the cover plate is prone to occur in the alignment process, so that the assembly yield of the electronic device is reduced, and display quality of the electronic device is affected. Through the arrangement of the elastic convex portions, when assembly is performed, a mounting position is adjusted or an impact is received, the support approaches the cover plate, and the elastic convex portions are compressed. An impact force of the support on the cover plate can be buffered in the process of compressing the elastic convex portions, to protect the cover plate, prevent the cover plate from cracking, and improve the assembly yield of the electronic device. After the impact or collision, the elastic convex portions are restored to an uncompressed state. Therefore, the elastic convex portions need to have a good elastic deformation capability. In the present application, the arrangement of the elastic convex portions prevents the support from impacting on the cover plate in the assembly process, and improves the assembly yield of the electronic device.

In a possible implementation, a gap is provided between the display screen and the support. The compressed elastic convex portions abut between the cover plate and the support, so that the support cannot continue to approach the cover plate and the display screen, and the elastic convex portions limit the position of the support, so as to prevent the support from continuously approaching the display screen and impacting on the display screen during the impact.

In a possible implementation, the cover plate surrounds to form a cylindrical enclosing space, and the support is accommodated in the enclosing space. In other words, the cover plate may have a 360° wrap-around structure, and the support is completely surrounded by the cover plate.

In a possible implementation, the cover plate surrounds to form a cylindrical structure, the cover plate includes two open ends, a direction in which the two open ends are arranged is an axial direction, and the first region, the second region, and the edge of the cover plate are arranged in sequence in the axial direction. The edge refers to a boundary of the cover plate in the axial direction, and the second region is located between the edge of the cover plate and the first region in the axial direction.

Specifically, in the axial direction, the edge of the cover plate includes a first edge and a second edge disposed opposite to each other, two second regions are provided, one second region is located between the first edge and the first region, and the other second region is located between the second edge and the first region. In other words, the two second regions are located at two ends of the first region, and elastic convex portions may be disposed between the two second regions and the support, so that a fixing strength between the cover plate and the support is increased, and structural stability of the electronic device is enhanced.

In a possible implementation, the electronic device further includes a first covering member and a second covering member, where the first covering member is connected to the first edge, and the second covering member is connected to the second edge. The first covering member and the second covering member each may have a plate-like structure with a uniform or substantially uniform thickness, such as a flat plate-like structure or a bent plate-like structure. Alternatively, the first covering member and the second covering member each may have a plate-like structure with a non-uniform thickness, and the first covering member and the second covering member may have a display function. The first covering member may be directly connected to the first edge, or the first covering member may be indirectly connected to the first edge by using a frame member or the like; similarly, the second covering member may be directly connected to the second edge, or the second covering member may be indirectly connected to the second edge by using a frame member or the like, to increase appearance refinement of the electronic device.

In a possible implementation, the electronic device further includes an in-screen camera and an in-screen fingerprint, where the in-screen camera is located at a position of the display screen adjacent to the first edge, and the in-screen fingerprint is located at a position of the display screen adjacent to the second edge. The in-screen camera and the in-screen fingerprint facilitate a full-screen design of the electronic device and improve user experience.

In a possible implementation, a colloid is disposed in a gap between the second region and the support, surrounds the elastic convex portions, and is fixedly connected to the cover plate and the support. During the assembly, the support and the cover plate can move relative to each other, resulting in structural instability of the electronic device. During the relative movement of the support and the cover plate, the support may protrude from an end of the cover plate, that is, the support leaks out, resulting in an appearance alignment problem between the support and the cover plate (the appearance alignment problem means that the support protrudes from the end of the cover plate, and the edge of the support can be seen from the outside of the electronic device), which affects appearance refinement of the electronic device. In this embodiment, relative positions of the cover plate and the support are first adjusted, and a colloid is dispensed between the second region of the cover plate and the support for fixation, that is, the colloid is used for filling between the second region and the support to fix the cover plate to the support, so that the cover plate and the support are in a fixed state, and the cover plate and the support cannot move relative to each other.

In a possible implementation, the support is provided with a colloid-blocking structure, a first accommodating space is formed between the support and the first region, a second accommodating space is formed between the support and the second region, the colloid is located in the second accommodating space, the colloid-blocking structure is located at a joint of the first accommodating space and the second accommodating space, and the colloid-blocking structure isolates the first accommodating space from the second accommodating space. The colloid has fluidity. During the dispensing, the colloid may flow to the display screen and be bonded to the display screen, affecting functions of the display screen. Through the arrangement of the colloid-blocking structure at the joint of the first accommodating space and the second accommodating space, the colloid is prevented from flowing to the display screen. Understandably, the colloid-blocking structure may be an elastic pad, and the elastic pad is sleeved on the support and is in close contact with the cover plate to prevent the colloid from flowing to the display screen through the gap between the cover plate and the support.

In a possible implementation, the colloid-blocking structure has an elastic deformation capability. The colloid-blocking structure may be made of silica gel, rubber, foam, or the like. Different from the elastic convex portion which needs to have a certain supporting strength, and needs to be capable of preventing the support from continuously approaching the cover plate and the display screen during the compression to achieve the limiting function, the colloid-blocking structure mainly prevents the colloid from flowing into the first accommodating space, and needs to have good airtightness, so as to completely isolate the first accommodating space from the second accommodating space. Understandably, the elastic convex portions may alternatively be made of a sealing material. When the shapes of the elastic convex portions are set to be capable of completely isolating the first accommodating space from the second accommodating space, the elastic convex portions each may also be used as a colloid-blocking structure, that is, the colloid-blocking structure may be integrated with the elastic convex portions, or the colloid-blocking structure may be independent of the elastic convex portions.

In a possible implementation, the support has a ring structure, the elastic convex portions are spherical, and a plurality of elastic convex portions are distributed at intervals in a wrap-around direction of the ring structure. The spherical elastic convex portions can bear a greater impact force and achieve the buffering function. The support may have a circular ring structure, an oval ring structure, an irregular ring structure, or the like. The elastic convex portions surround the ring structure for at least one round. Specifically, the elastic convex portions may surround the support for one, two, three or another number of rounds in a wrap-around direction of the ring structure, and eight, ten, fourteen or another number of elastic convex portions may be provided in each round. Quantities and arrangements of the elastic convex portions in different rounds may be the same or different. The elastic convex portions are disposed at intervals, and a gap between adjacent elastic convex portions provides a space for extension and retraction of the elastic convex portions.

In a specific implementation, the cover plate may be provided with grooves matching the shapes of the spherical elastic convex portions, and when the support provided with the elastic convex portions is aligned with the cover plate, local elastic convex portions may be clamped in the grooves to position the support and the cover plate. In addition, that the local elastic convex portions are located in the grooves can prevent relative shaking of the cover plate and the support which affects structural stability of the electronic device.

Understandably, the elastic convex portions may alternatively have a spherical deformation structure such as an oval structure, a D-shaped structure, or a C-shaped structure. The spherical elastic convex portions are distributed at intervals, that is, a gap is provided between the elastic convex portions. In the process of colloid injection, the colloid with good fluidity can flow through the gap between the adjacent elastic convex portions to fill the second accommodating space, so that a high connection strength between the support and the cover plate is fixed, thereby preventing the shaking of the support and the cover plate from leading to poor structural stability of the electronic device. In addition, to quickly fill the second accommodating space with the colloid, the spherical elastic convex portions may be further provided with colloid injection holes, so that the colloid may not only flow through the gap between the adjacent elastic convex portions, but also flow through the colloid injection holes to fill the second accommodating space.

A length of each colloid injection hole in an axial direction should not be excessively large, that is, a diameter of each spherical elastic convex portion should not be excessively large, otherwise, the colloid easily blocks the colloid injection hole when passing through the longer colloid injection hole. A size of the colloid injection hole in a radial direction should not be excessively small, otherwise, the colloid easily blocks the colloid injection hole when passing through the thinner colloid injection hole. The colloid injection hole needs to run through the spherical elastic convex portion in the axial direction, and the size of the colloid injection hole in the axial direction is related to the size of the elastic convex portion in the axial direction. The specific size of the colloid injection hole in the radial direction needs to be determined according to the fluidity of the colloid. If a colloid has better fluidity, the size of the colloid injection hole in the radial direction may not be set excessively large, so that the colloid may still smoothly pass through the colloid injection hole. If a colloid has poorer fluidity, the size of the colloid injection hole needs to be set larger in the radial direction, so as to effectively prevent the colloid from blocking the colloid injection hole.

A quantity of colloid injection holes provided in each elastic convex portion is not limited, and may be one, two, three, or the like. It should be noted that when it is ensured that the colloid can smoothly flow through the colloid injection holes and fill the second accommodating space, the colloid injection holes in each elastic convex portion should not be excessive and the size should not be excessively large. When the colloid injection holes in each elastic convex portion are excessive and the size is excessively large, a smaller force may cause a larger deformation of the elastic convex portion, so that the support may impact on the cover plate and the display screen, and the buffering effect on the impact force generated by the support is affected.

In a possible implementation, the elastic convex portions are distributed at equal intervals in a wrap-around direction of the ring structure. Distribution at equal intervals means that straight-line distances between adjacent elastic convex portions are equal. The distances between the adjacent elastic convex portions are defined as being equal, so that a plurality of elastic convex portions are uniformly distributed in the wrap-around direction of the ring structure. The uniformly distributed elastic convex portions make the structure of the support in a circumferential direction (that is, the wrap-around direction) symmetrical, which facilitates assembly and positioning, and can improve assembly efficiency.

In other implementations, the elastic convex portions may alternatively be distributed irregularly between the cover plate and the support. For example, the elastic convex portions are not distributed for one round in the wrap-around direction of the ring structure, or the elastic convex portions are not uniformly distributed at equal intervals, as long as the problem that the support collides with the cover plate and the display screen in the process of assembling the electronic device can be resolved. For example, in the electronic device with a curved surface structure, a cover plate generally includes a bent portion and a plate-like portion. In a specific implementation, a quantity of elastic convex portions corresponding to the bent portion of the cover plate may be greater than a quantity of elastic convex portions corresponding to the plate-like portion of the cover plate. When the bent portion is subjected to collision, cracks or breakage is more likely to occur. Correspondingly arranging more elastic convex portions on the bent portion can effectively buffer the impact of the support on the bent portion of the cover plate and protect the cover plate.

In a possible implementation, the elastic convex portions each have a U-shaped structure, and an open end of the U-shaped structure faces the cover plate, or the open end of the U-shaped structure faces the support, or the open end of the U-shaped structure faces the display screen, or the open end of the U-shaped structure faces away from the display screen. When the elastic convex portions each have a U-shaped structure, open ends of the U-shaped structures may face different directions, as long as the U-shaped structures can elastically abut between the cover plate and the support to achieve a telescopic limiting function and prevent the support from impacting on the display screen and the cover plate. The elastic convex portions with the U-shaped structure may be distributed for one, two or three or another number of rounds in the wrap-around direction of the support. In the same implementation, a U-shaped structure with an open end facing the cover plate and a U-shaped structure with an open end facing the support may alternatively be included, or a U-shaped structure with an open end facing the display screen and a U-shaped structure with an open end that faces away from the display screen are included.

Each elastic convex portion with the U-shaped structure includes a first mounting portion, a bent portion, and a second mounting portion that are connected in sequence, where the first mounting portion and the second mounting portion are oppositely disposed, and the bent portion is disposed opposite to the open end of the U-shaped structure. Each elastic convex portion with the U-shaped structure has an excellent elastic deformation capability, and can effectively buffer an impact force of the support on the cover plate. A space surrounded by the first mounting portion, the bent portion, and the second mounting portion of the elastic convex portion with the U-shaped structure may be filled with a colloid, which increases the elastic deformation capability of the elastic convex portion with the U-shaped structure, and also effectively enhances a connection strength between the support and the cover plate.

Specifically, when the open end of the elastic convex portion with the U-shaped structure faces the cover plate, the first mounting portion is away from the display screen, and the second mounting portion is adjacent to the display screen. Colloid injection holes may be provided in the first mounting portion and the second mounting portion, so that the colloid may flow to an inner space of the elastic convex portion with the U-shaped structure through the colloid injection holes in the first mounting portion, and then flow, through the colloid injection holes in the second mounting portion, to one side of the elastic convex portion with the U-shaped structure facing the display screen to surround the elastic convex portion with the U-shaped structure, so as to increase the connection strength between the support and the cover plate. Alternatively, when the open end of the elastic convex portion with the U-shaped structure faces the support, the first mounting portion is away from the display screen, and the second mounting portion is adjacent to the display screen. Similarly, colloid injection holes may be provided in the first mounting portion and the second mounting portion. Details are not described herein. When the open end of the elastic convex portion with the U-shaped structure faces the display screen, or when the open end of the elastic convex portion with the U-shaped structure faces away from the display screen, colloid injection holes may be provided in the bent portion of the U-shaped structure, so that the colloid may flow, through the colloid injection holes of the bent portion, from one side of the elastic convex portion with the U-shaped structure away from the display screen to the other side of the elastic convex portion close to the display screen to surround the elastic convex portion, so as to increase the fixing strength between the cover plate and the support.

Understandably, a distance between the first mounting portion and the second mounting portion of the elastic convex portion with the U-shaped structure should not be excessively large, otherwise the strength of the elastic convex portion is insufficient, the structure is unstable, and when subjected to an impact, the elastic convex portion cannot effectively support the support or prevent the support from approaching the cover plate and the display screen.

In a possible implementation, the elastic convex portions each include a fixed portion and at least two convex hulls located at one end of the fixed portion, where one end of the fixed portion away from the convex hulls is connected to the support, a groove is formed between adjacent convex hulls, and the convex hulls are in contact with the cover plate. The elastic convex portion includes at least two convex hulls, which can increase a contact area between the elastic convex portion and the cover plate and effectively buffer the impact force. The groove formed between the adjacent convex hulls increases the space for extension and retraction of the convex hulls, which can effectively release the impact force and reduce the impact force of the support on the cover plate. Understandably, the elastic convex portions may be distributed for one, two or three or another number of rounds in the wrap-around direction of the support.

To facilitate the filling of the space between the cover plate and the support with the colloid in the colloid injection process, colloid injection holes may be provided in both the fixed portion and the convex hulls. The colloid may flow, through the colloid injection holes of the fixed portion and the gap between adjacent elastic convex portions, from one side of each elastic convex portion away from the display screen to the other side of the elastic convex portion close to the display screen to surround the elastic convex portion, and the colloid may also flow into the groove between the adjacent convex hulls through the colloid injection holes in the convex hulls, so as to increase the fixing strength between the cover plate and the support.

In a possible implementation, the elastic convex portions each have a strip-shaped structure, and a plurality of strip-shaped structures are disposed at intervals in a wrap-around direction of the support. The strip-shaped structure increases the contact area between the elastic convex portion and the cover plate and the support, and can effectively buffer the impact force. In addition, it is easy to change the shape of the flexible strip-shaped structure to closely abut against the cover plate and the support. Specifically, the elastic convex portion with the flexible strip-shaped structure may be bent into a shape matching the support and the cover plate, and abut between the support and the cover plate, which can effectively buffer the collision of the support against the cover plate. The elastic convex portions with the strip-shaped structure may be distributed for at least one round in the wrap-around direction of the support.

In the colloid injection process, the colloid may flow through the gap between the adjacent elastic convex portions with the strip-shaped structure to fill the second accommodating space and increase the fixing strength between the cover plate and the support; or colloid injection holes may be provided in each elastic convex portion with a strip-shaped structure, so that the colloid may flow, through the colloid injection holes in the elastic convex portion with the strip-shaped structure, from one side of the elastic convex portion away from the display screen to the other side of the elastic convex portion close to the display screen to surround the elastic convex portion.

In a possible implementation, the elastic convex portions each have an integrated wrap-around structure, and the elastic convex portions surround on a surface of the support that faces the cover plate. Understandably, each elastic convex portion may be an elastic pad, and the elastic pad is sleeved on a periphery of the support and abuts against the surface of the cover plate. The elastic convex portions with the integrated wrap-around structure are easy to fix. One, two, three, or another number of elastic convex portions with the integrated wrap-around structure may be provided, and the adjacent elastic pads are distributed at intervals.

In the colloid injection process, colloid injection holes may be provided in each elastic convex portion with the integrated wrap-around structure, so that the colloid may flow, through the colloid injection holes in the elastic convex portion with the integrated wrap-around structure, from one side of the elastic convex portion away from the display screen to the other side of the elastic convex portion close to the display screen to surround the elastic convex portion. The colloid passing through the colloid injection holes of the elastic convex portion with the integrated wrap-around structure is blocked by the colloid-blocking structure, so that the colloid is prevented from flowing to the display screen. The elastic convex portion needs to have a certain supporting strength, and needs to be capable of preventing the support from continuously approaching the cover plate and the display screen during the compression to achieve the limiting function. However, the colloid-blocking structure mainly prevents the colloid from flowing into the first accommodating space, and needs to have good airtightness, so as to completely isolate the first accommodating space from the second accommodating space. Understandably, when the elastic convex portion and the colloid-blocking structure are both elastic pads, the elastic concave portions may be provided with colloid injection holes, but the colloid-blocking structure cannot have a pore structure. In addition, the thickness of the elastic convex portion is greater than that of the colloid-blocking structure, that is, the size of the elastic convex portion in the axial direction is greater than the size of the colloid-blocking structure in the axial direction. In this way, the strength of the elastic convex portion is greater than the strength of the colloid-blocking structure, and the elastic convex portion can provide a certain supporting force for the cover plate and the support, but the colloid-blocking structure only needs to have a good sealing effect, and may be relatively thin and light, thereby facilitating the lightening of the entire electronic device.

Understandably, the specific shape of the elastic concave portion is not limited to the spherical shape, the U-shaped structure, the convex hull structure, the strip-shaped structure, and the integrated wrap-around structure, or the foregoing implementations may be used in combination. For example, in the same implementation, spherical elastic concave portions and elastic concave portions with a U-shaped structure may be included, as long as the sizes of the spherical elastic concave portions and the elastic concave portions with the U-shaped structure are controlled to match, so that the spherical elastic concave portions and the elastic concave portions with the U-shaped structure can abut between the cover plate and the support. In other words, while the spherical elastic convex portions are in contact with both the cover plate and the support, the elastic convex portions with the U-shaped structure are also in contact with both the cover plate and the support. In other implementations, spherical elastic convex portions, elastic convex portions with a U-shaped structure, and elastic convex portions with a strip-shaped structure may alternatively be included, as long as the elastic convex portions with different structures can abut between the cover plate and the support.

In a possible implementation, the elastic convex portions are each fixedly connected to the support, and one end of each of the elastic convex portions away from the support elastically abuts against the cover plate. Understandably, each elastic convex portion and the support may be integrally formed, or may have an assembled structure. The support may be made of plastic, and the elastic convex portion may be made of a material with a good elastic deformation capability, such as rubber, silica gel, or foam, or the elastic convex portion is a spring, an elastic metal sheet, or the like, as long as the elastic convex portion can buffer the impact force of the support on the cover plate. With rubber as an example, when the elastic convex portion and the support have an assembled structure, the support may be provided with a clamping groove, the elastic convex portion made of rubber is provided with a clamping block, and the clamping block is clamped in the clamping groove, or the elastic convex portion made of rubber is bonded to the support by using a colloid. When the elastic concave portion is a spring or an elastic metal sheet, the elastic concave portion may alternatively be fixed to the support through gluing. In a possible implementation, a surface of the cover plate is provided with a protective layer, and the protective layer is in contact with the elastic convex portions. The protective layer may be made of foam, or the like. When the elastic convex portion is a spring or an elastic metal sheet, a direct contact between the elastic convex portion and the cover plate may damage the cover plate. A protective layer may be disposed between the elastic convex portion and the cover plate, and may be fixed to the cover plate through gluing, so that the elastic convex portion is in contact with the protective layer to prevent the cover plate from being scratched.

In a possible implementation, the surface of the cover plate is provided with a rough structure, and the elastic convex portions are in contact with the rough structure. The rough structure may be a textured structure or a granular structure to increase surface roughness of the cover plate, so that when the elastic concave portion is in contact with the cover plate, a relatively large friction force may be generated between the elastic concave portion and the cover plate, to prevent the support fixedly connected to the elastic concave portion from sliding relative to the cover plate in the assembly process, which improves structural stability of the electronic device.

In a possible implementation, the elastic convex portions are each fixedly connected to the cover plate, and one end of each of the elastic convex portions away from the cover plate elastically abuts against the support. The cover plate may be made of glass, and the cover plate and the elastic convex portion may have an assembled structure. Specifically, the elastic convex portion may be bonded to the cover plate by using a colloid, or the elastic convex portion is viscous, and the elastic convex portion is bonded to the cover plate by using its own viscosity. During assembly, the cover plate to which the elastic convex portion is fixed is aligned with the support, and the elastic convex portion abuts against the surface of the support. The elastic convex portion may also form an assembled structure with the cover plate or the support by using other connection methods, and no limitation is imposed in the present application.

When the elastic convex portion is fixedly connected to the surface of the cover plate facing the support, because the surface of the cover plate facing the support is enclosed to form a curved space, it is inconvenient to fix the elastic convex portion. When the elastic convex portion is fixedly connected to the surface of the support facing the cover plate, it is convenient to operate and easy to fix the elastic convex portion, and fixation efficiency is high, which improves assembly efficiency of the electronic device.

In a possible implementation, the support includes a connection portion and a support portion, where the support portion is located between an edge of the support and the connection portion, the display screen is located between the cover plate and the connection portion, the elastic convex portions are located between the cover plate and the support portion, and a vertical distance between the support portion and the cover plate is less than a vertical distance between the connection portion and the cover plate. In other words, a gap between the support portion and the cover plate is smaller than a gap between the connection portion and the cover plate. This may make the size of the elastic concave portion abutting between the support portion and the cover plate smaller, and prevent the gap between the support portion and the cover plate from being excessively large. If the size of the elastic concave portion is excessively large, the cover plate and the support are prone to dislocation during impacting or shaking, which affects structural stability of the electronic device.

The support portion and the connection portion form a stepped surface, and a gap is provided between an end face of the display screen and the stepped surface. This can prevent the support from impacting on the display screen when the position of the support is relatively unfixed in the assembly process.

In a possible implementation, a buffer layer is disposed between the connection portion and the display screen, and the buffer layer is located on a surface of the connection portion facing the display screen. The buffer layer may be fixed to the connection portion of the support through gluing. The buffer layer may be made of foam, and the foam is light in weight, good in elasticity, and easy to process in shape, which can reduce the weight of the electronic device. During the impact, the buffer layer can buffer the impact force of the support on the display screen, and the buffer layer can prevent the support from being in direct contact with the display screen, thereby effectively reducing the impact of the support on the display screen. Understandably, the foam may be in contact with the surface of the display screen, but no overpressure should occur between the foam and the display screen, that is, the foam and the display screen cannot be pressed tightly against each other, to prevent the display screen from being damaged in case of overpressure. In other implementations, a gap may alternatively be provided between the foam and the display screen. When the electronic device is subjected to collision, the buffer layer approaches the display screen and releases a received collision force.

In a possible implementation, the electronic device further includes a middle frame, a through hole is provided inside the support, the middle frame passes through the through hole, a main board is disposed on the middle frame, and the display screen is electrically connected to the main board. The display screen may be an organic light-emitting diode, and the main board is provided with a driving unit to drive the display screen to display. The middle frame may be further provided with a battery mounting region and an antenna mounting region for mounting batteries and antennas to implement functionalization of the electronic device.

In the present application, the elastic convex portions are disposed between the cover plate and the support, so that the support is prevented from impacting on the cover plate in the assembly process, and the assembly yield of the electronic device is improved. In the present application, a colloid is dispensed between the second region of the cover plate and the support for fixation, which prevents relative shaking of the cover plate and the support, increases concentricity of the cover plate and the support, and improves appearance refinement and structural stability of the electronic device. In addition, in the present application, the buffer layer is disposed between the display screen and the support. The buffer layer usually has good elasticity, and can buffer the impact force of the support on the display screen. When coming into collision and contact with the display screen, the buffer layer can be compressed to avoid damaging the display screen.

BRIEF DESCRIPTION OF DRAWINGS

Accompanying drawings used in embodiments of the present application are described below.

DESCRIPTION OF EMBODIMENTS

Embodiments of the present application are described below in conjunction with the accompanying drawings in the embodiments of the present application.

Figure 1:
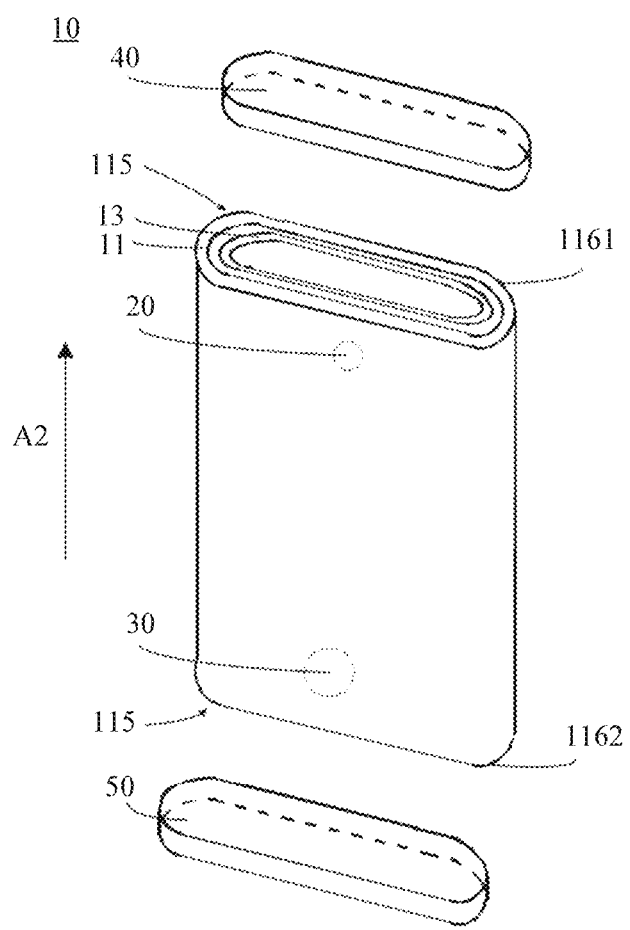
FIG. 1 is a schematic diagram of a three-dimensional structure of an electronic device according to an embodiment of the present application.

The present application provides an electronic device. The electronic device may be a mobile phone, a tablet computer, an e-reader, or the like. With a mobile phone as an example, as shown in FIG. 1, FIG. 1 is a schematic diagram of a three-dimensional structure of an electronic device. The electronic device 10 may be a wrap-around mobile phone with a curved surface structure, such as a 360° wrap-around mobile phone, that is, the display screen of the electronic device 10 has a 360° wrap-around structure, and the appearance surfaces around the electronic device 10 have a display function, bringing good user experience.

Figure 2:
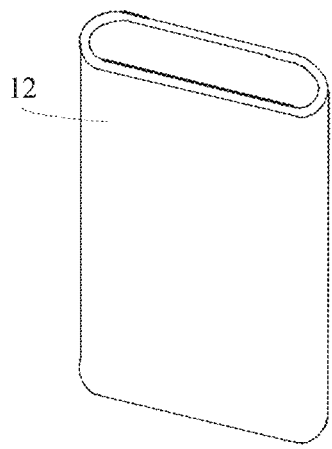
FIG. 2 is a schematic diagram of an electronic device with a display screen having an integrated structure according to an embodiment of the present application.
Figure 3:
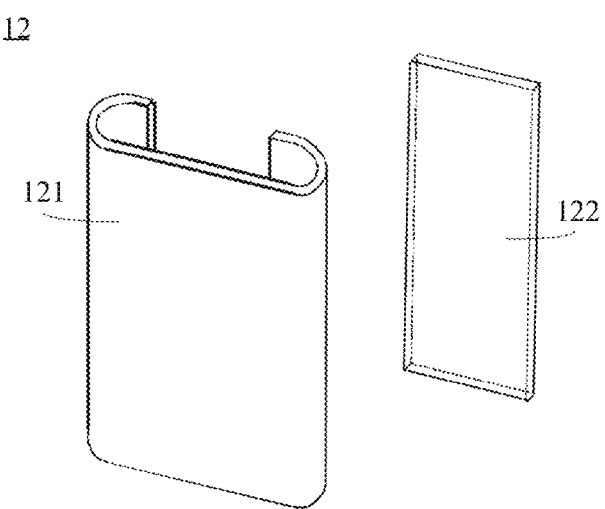
FIG. 3 is a schematic diagram of an electronic device with a display screen having a split structure according to an embodiment of the present application.

As shown in FIG. 1, FIG. 2, and FIG. 3, FIG. 2 is a schematic diagram of an electronic device with a display screen having an integrated structure, and FIG. 3 is a schematic diagram of an electronic device with a display screen having a split structure. The electronic device 10 includes a cover plate 11, a display screen 12, and a support 13, and the display screen 12 is located between the cover plate 11 and the support 13. Referring to FIG. 2, the display screen 12 may have an integrated structure, which specifically may be a 360° wrap-around integrated structure. Requirements for installation accuracy of the display screen 12 with the integrated structure are higher, and higher installation accuracy of the display screen 12, the cover plate 11 and the support 13 is required in the assembly process. The display screen 12 with the integrated structure has good display quality as a whole, which avoids a problem of poor display at a splicing part of a split display screen during assembly. Referring to FIG. 3, the display screen 12 may alternatively have a split structure. The display screen 12 includes a first display portion 121 and a second display portion 122. The first display portion 121 and the second display portion 122 are fixedly connected to jointly form the warp-around display screen 12. The display screen 12 with the split structure is convenient to assemble.

Similarly, the cover plate 11 may have a 360° wrap-around structure, or the cover plate 11 may have an integrated structure, or the cover plate 11 may have a split structure. The shape and size of the cover plate 11 match those of the display screen 12, and the cover plate 11 is installed on one side of the display screen 12 that faces away from the support 13. In other words, the cover plate 11 surrounds to form a cylindrical enclosing space, and the support 13 is accommodated in the enclosing space of the cover plate 11, that is, the support 13 is completely surrounded by the cover plate 11.

The cover plate 11 has a cylindrical structure, and the cover plate 11 includes two open ends 115. A direction in which the two open ends 115 are arranged is used as an axial direction A2, and a direction perpendicular to the axial direction A2 is used as a radial direction A3. In the axial direction A2, the edge of the cover plate 11 includes a first edge 1161 and a second edge 1162 that are opposite to each other. The electronic device 10 is further provided with an in-screen camera 20 and an in-screen fingerprint 30, where the in-screen camera 20 is located at a position of the display screen adjacent to the first edge 1161, and the in-screen fingerprint 30 is located at a position of the display screen adjacent to the second edge 1162. The in-screen camera 20 and the in-screen fingerprint 30 facilitate a full-screen design of the electronic device 10 and improve user experience.

The electronic device 10 is provided with a first covering member 40 and a second covering member 50. The first covering member 40 is connected to the first edge 1161, and the second covering member 50 is connected to the second edge 1162. The first covering member 40 and the second covering member 50 are oppositely disposed. The first covering member 40 and the second covering member 50 each may have a plate-like structure with a uniform or substantially uniform thickness, such as a flat plate-like structure or a bent plate-like structure. Alternatively, the first covering member 40 and the second covering member 50 each may have a plate-like structure with a non-uniform thickness, and the first covering member 40 and the second covering member 50 may have a display function. The first covering member 40 may be directly connected to the first edge 1161, or the first covering member 40 may be indirectly connected to the first edge 1161 by using a frame member or the like, to increase appearance refinement of the electronic device 10. Similarly, the second covering member 50 may be directly connected to the second edge 1162, or the second covering member 50 may be indirectly connected to the second edge 1162 by using a frame member or the like.

Figure 4:
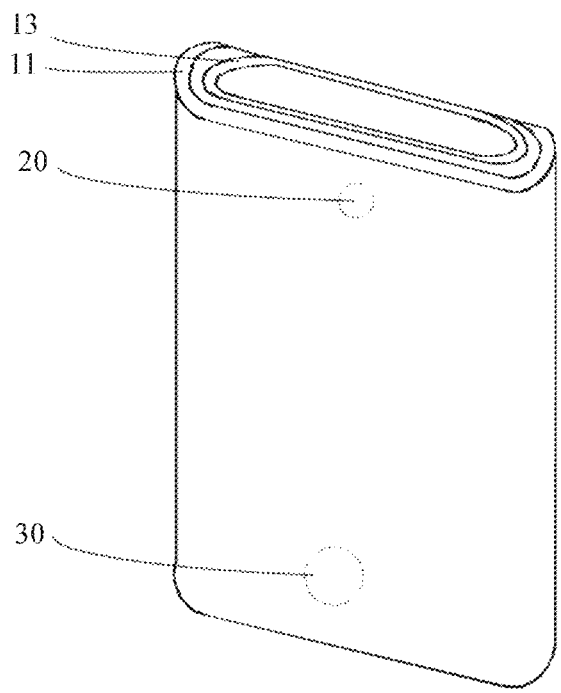
FIG. 4 is a schematic diagram of a three-dimensional structure of another electronic device according to an embodiment of the present application.

In other implementations, as shown in FIG. 4, the cover plate 11 may only surround a part of the support 13, that is, the display screen (not shown in FIG. 4, the display screen is located between the cover plate 11 and the support 13) only surrounds the part of the support 13, and the cover plate 11 and the display screen have a bent structure. In other words, the electronic device 10 may have a 360° wrap-around display structure, that is, a display surface of the electronic device 10 is in 360° display. The electronic device 10 may alternatively be a partial display structure. Specifically, the electronic device 10 may have a partial display structure including a flat display surface and curved display surfaces located on two sides of the flat display surface as shown in FIG. 4. The electronic device 10 may alternatively have a partial display structure with an integrated curved surface. For example, the electronic device 10 may have a 225° wrap-around display structure, and no limitation is imposed in the present application.

Figure 5:
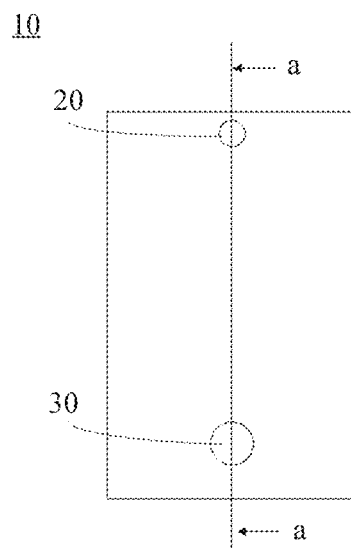
FIG. 5 is a front view of an electronic device according to an embodiment of the present application.
Figure 6:
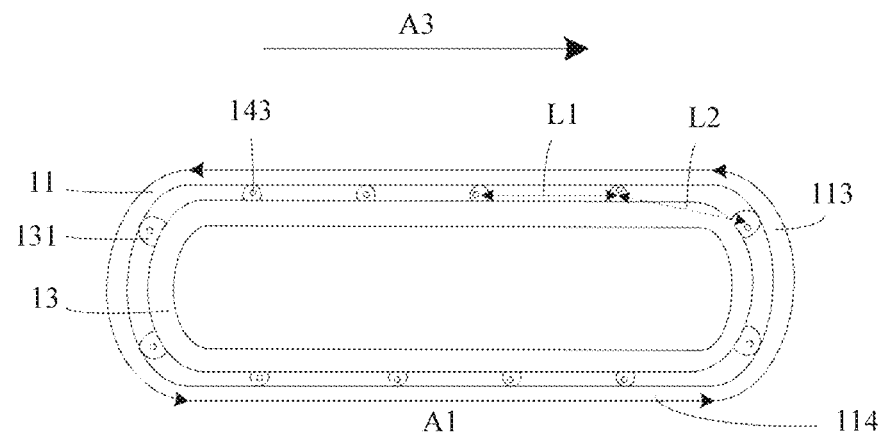
FIG. 6 is a top view of an electronic device according to an embodiment of the present application.
Figure 7:
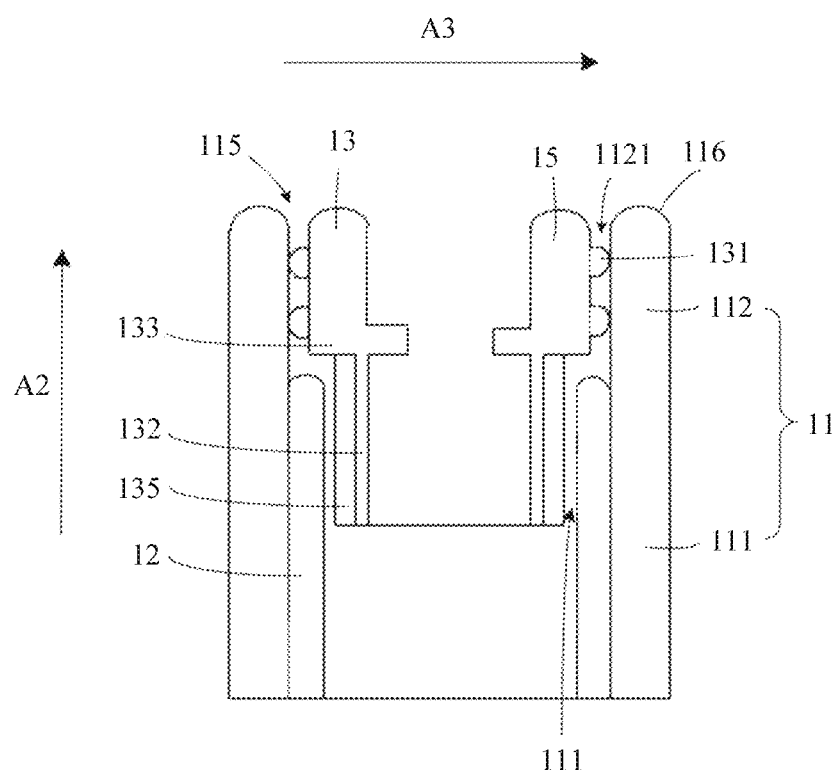
FIG. 7 is a sectional view of an electronic device according to an embodiment of the present application in a direction a-a in FIG. 5.

As shown in FIG. 5, FIG. 6, and FIG. 7, FIG. 5 is a front view of an electronic device, FIG. 6 is a top view of the electronic device, and FIG. 7 is a sectional view of the electronic device in a direction a-a in FIG. 5. FIG. 5 and FIG. 6 are the front view and the top view of the electronic device from the perspective of FIG. 1, and FIG. 6 is a top view of the electronic device when the first covering member 40 is not assembled. The cover plate 11 and the display screen 12 of the electronic device 10 are stacked and disposed around the support 13. The display screen 12 is disposed close to the support 13. The cover plate 11 is located on one side of the display screen 12 that faces away from the support 13. The cover plate 11 can protect the display screen 12, and the support 13 is configured to support the cover plate 11 and the display screen 12. The cover plate 11 includes a first region 111 and second regions 112. Each of the second regions 112 is located between an edge of the cover plate 11 and the first region 111, that is, the second region 112 is close to an end of the electronic device 10. The cover plate 11 may include a second region 112, a first region 111 and a second region 112 that are connected in sequence (referring to FIG. 24, FIG. 7 only schematically shows a partial structure of the electronic device 10). The display screen 12 is located between the first region 111 and the support 13, elastic convex portions 131 are disposed between the second region 112 and the support 13, and the elastic convex portion 131 each elastically abut between the second region 112 and the support 13. Understandably, an accommodating space is formed between the cover plate 11 and the support 13. Specifically, a first accommodating space 1111 is formed between the support 13 and the first region 111, a second accommodating space 1121 is formed between the support 13 and the second region 112, the display screen 12 is located in the first accommodating space 1111, and the elastic convex portions 131 are located in the second accommodating space 1121.

Referring to FIG. 1 and FIG. 7, the first region 111, the second region 112, and the edge 116 of the cover plate 11 are arranged in sequence in the axial direction A2. The edge 116 refers to a boundary of the cover plate 11 in the axial direction A2, and the second region 112 is located between the edge 116 of the cover plate 11 and the first region 111 in the axial direction A2.

Figure 8:
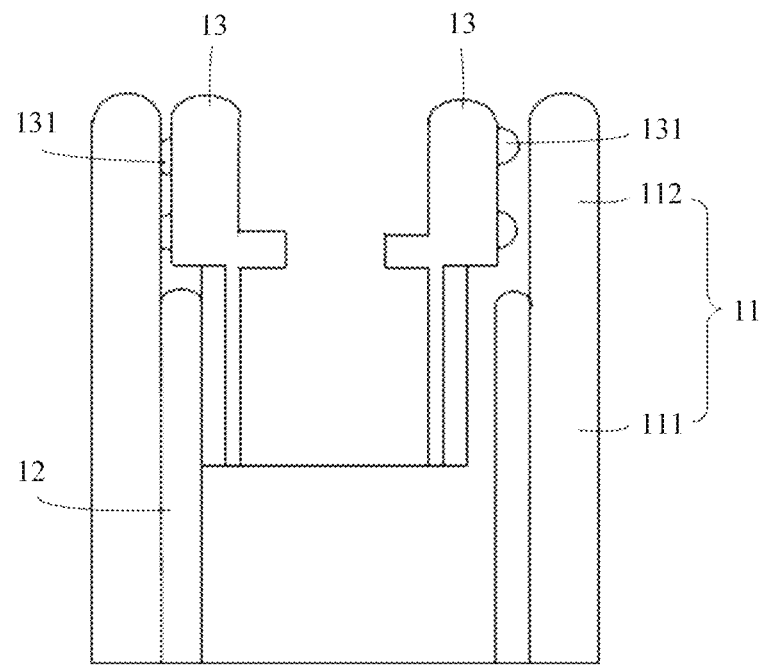
FIG. 8 is a schematic structural diagram of an electronic device according to an embodiment of the present application after collision.

In the present application, through the arrangement of the elastic convex portions 131 between the second region 112 of the cover plate 11 and the support 13, a problem that the support 13 impacts on the cover plate 11 in the process of assembling the electronic device 10 is resolved. Specifically, when the electronic device 10 is assembled, alignment between the support 13 and the cover plate 11 needs to be adjusted, and the problem that the support 13 impacts on the cover plate 11 is prone to occur in the alignment process, resulting in cracks or even breakage of the cover plate 11, so that the assembly yield of the electronic device 10 is reduced, and display quality of the electronic device 10 is affected. In the present application, through the arrangement of the elastic convex portions 131, when assembly is performed, a mounting position is adjusted or an impact is received, one side of the support 13 approaches the cover plate 11, and the elastic convex portions 131 are compressed. Referring to FIG. 8, in FIG. 8, the elastic convex portions 131 on one side of the support 13 are compressed, and a gap is provided between the elastic convex portions 131 on the other side of the support 13 and the cover plate 11. An impact force of the support 13 on the cover plate 11 can be buffered in the process of compressing the elastic convex portions 131, to protect the cover plate 11, prevent the cover plate 11 from cracking, and improve the assembly yield of the electronic device 10.

A gap is provided between the display screen 12 and support 11. The compressed elastic convex portions 131 abut between the cover plate 11 and the support 13, so that the support 13 cannot continue to approach the cover plate 11 and the display screen 12, and the elastic convex portions 131 limit the position of the support 13, so as to prevent the support 13 from impacting on the display screen 12.

After the collision, the elastic convex portions 131 are restored to an uncompressed state in FIG. 7. Therefore, the elastic convex portions 131 need to have a good elastic deformation capability. In the present application, the arrangement of the elastic convex portions 131 prevents the support 13 from damaging the cover plate 11 and impacting on the display screen 12 in the assembly process, and improves the assembly yield of the electronic device 10.

Figure 9:
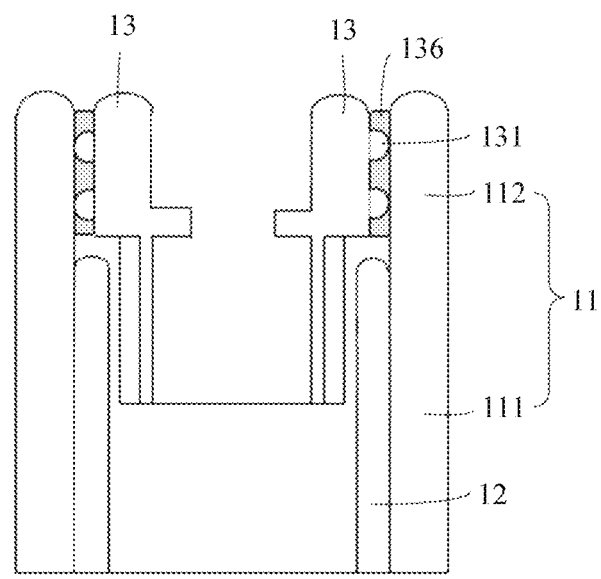
FIG. 9 is a schematic structural diagram of an electronic device according to an embodiment of the present application after dispensing.

During the assembly of the electronic device 10, after the elastic convex portions 131 abut between the cover plate 11 and the support 13, relative positions of the cover plate 11 and the support 13 are not fixed, that is, the cover plate 11 and the support 13 can still move relative to each other, resulting in structural instability of the electronic device 10. During the relative movement of the support 13 and the cover plate 11, the support 13 may protrude from an end of the cover plate 11, that is, the support 13 leaks out, resulting in an appearance alignment problem between the support 13 and the cover plate 11 (the appearance alignment problem means that the support 13 protrudes from the end of the cover plate 11, and the edge of the support 13 can be seen from the outside of the electronic device 10), which affects appearance refinement of the electronic device 10. Referring to FIG. 9, FIG. 9 is a schematic structural diagram of an electronic device after dispensing. In the present application, a colloid 136 is disposed in a gap between the second region 112 of the cover plate 11 and the support 13, so that the colloid 136 fills a gap between elastic convex portions 131 and surround the elastic convex portions 131, and the colloid 136 fixedly connects the cover plate 11 to the support 13, thereby preventing relative movement of the cover plate 11 and the support 13 from causing an alignment problem between the cover plate 11 and the support 13.

Figure 10:
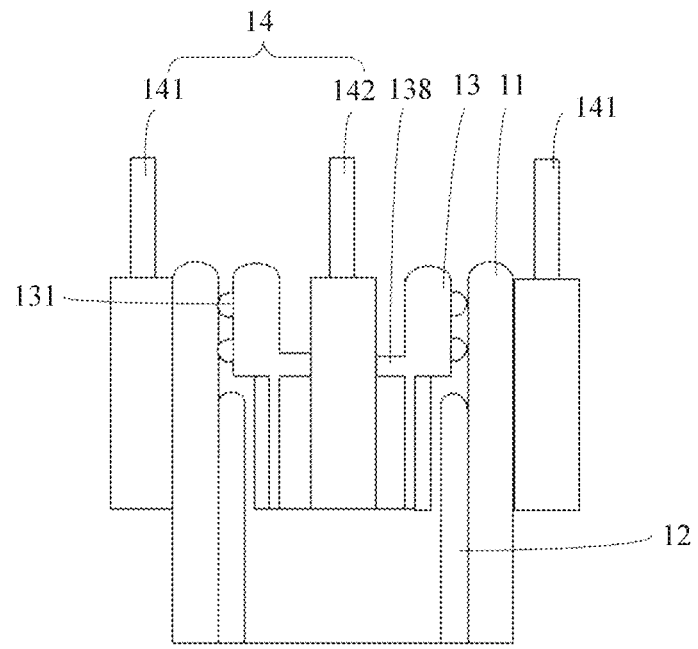
FIG. 10 is a schematic diagram showing a specific operation of dispensing of an electronic device according to an embodiment of the present application.
Figure 11:
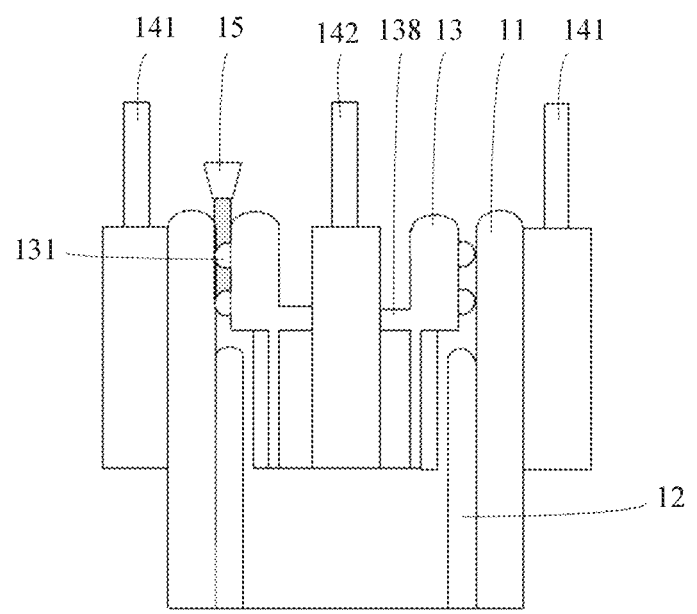
FIG. 11 is a schematic diagram showing another specific operation of dispensing of an electronic device according to an embodiment of the present application.

As shown in FIG. 10 and FIG. 11, FIG. 10 and FIG. 11 are each a schematic diagram of a specific operation of dispensing of an electronic device. In this implementation, relative positions of the cover plate 11 and the support 13 may be fixed by using a limiting fixture 14 and dispensing is performed. Specifically, the limiting fixture 14 includes a first fixture 141 and a second fixture 142. The first fixture 141 is attached to the surface of the cover plate 11 that faces away from the support 13, and the second fixture 142 extends into a through hole of the support 13 and is clamped between limiting portions 138 of the support 13. Before or during fixing with the limiting fixture 14, the relative positions of the cover plate 11 and the support 13 may be adjusted so that the cover plate 11 and the support 13 correspond to each other, and the support 13 is prevented from protruding from the edge of the cover plate 11. Understandably, in the process of positioning by using the limiting fixture 14, the limiting fixture 14 needs to clamp the cover plate 11 and the support 13, but the limiting fixture 14 cannot clamp the cover plate 11 excessively tightly to protect the cover plate 11 from damage caused by excessively tight squeezing.

After the limiting fixture 14 fixes the relative positions of the cover plate 11 and the support 13, a colloid is dispensed for fixation between the cover plate 11 and the support 13 by using a jig 15. After the dispensing operation is completed, the colloid is cured, and then the limiting fixture 14 and the dispensing jig 15 are removed, to obtain the electronic device 10 provided with the colloid 136 as shown in FIG. 9.

After the dispensing treatment, the shapes of the elastic convex portions 131 are fixed, and the cover plate 11 and the support 13 are also in a fixed state, so that the cover plate 11 and the support 13 cannot move relative to each other, thereby improving appearance refinement and structural stability of the electronic device 10.

Figure 12:
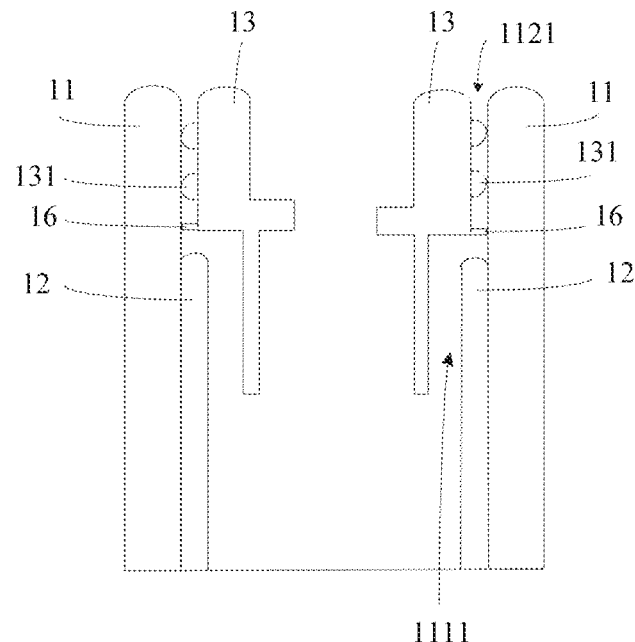
FIG. 12 is a schematic diagram of a colloid-blocking of an electronic device according to an embodiment of the present application.

It should be noted that the colloid has fluidity. In the dispensing process, the colloid may flow to the display screen 12 and be bonded to the display screen 12, thereby affecting the function of the display screen 12. Referring to FIG. 12, to prevent the colloid from flowing to the display screen 12 in the dispensing process, In this embodiment, a colloid-blocking structure 16 is disposed on the support 13, and the colloid-blocking structure 16 is configured to block the flow of the colloid to prevent the colloid from flowing to the display screen 12. Specifically, the colloid-blocking structure 16 is located at a joint of the first accommodating space 1111 and the second accommodating space 1121, and the colloid-blocking structure 16 is configured to isolate the first accommodating space 1111 from the second accommodating space 1121. The colloid flows from the second accommodating space 1121 toward the first accommodating space 1111, and the colloid-blocking structure 16 disposed at the joint of the first accommodating space 1111 and the second accommodating space 1121 can prevent the colloid from flowing to the display screen 12. Understandably, the colloid-blocking structure 16 may be an elastic pad, and the elastic pad is sleeved on the support 13 and is in close contact with the cover plate 11 to prevent the colloid from flowing to the display screen 12 through the gap between the cover plate 11 and the support 13.

The colloid-blocking structure 16 needs to have an elastic deformation capability, so that the colloid-blocking structure 16 can be compressed together with the elastic convex portions 131 when subjected to collision in the assembly process. If the colloid-blocking structure 16 does not have an elastic deformation capability and cannot be compressed, then the colloid-blocking structure 16 abuts between the cover plate 11 and the support 13 when subjected to collision, so that the elastic convex portions 131 cannot be compressed, and the elastic convex portions 131 cannot buffer the impact force. Different from the elastic convex portion 131 which needs to have a certain supporting strength, and needs to be capable of preventing the support 13 from continuously approaching the cover plate 11 and the display screen 12 during the compression to achieve the limiting function, the colloid-blocking structure 16 mainly prevents the colloid from flowing into the first accommodating space 1111, and needs to have good airtightness, so as to completely isolate the first accommodating space 1111 from the second accommodating space 1121. The colloid-blocking structure 16 may be made of silica gel, rubber, foam, or the like. The colloid-blocking structure 16 may be fixed to the support 13 through gluing. In other implementations, the colloid-blocking structure 16 may alternatively be disposed on the cover plate 11 and be in close contact with the support 13. Understandably, the elastic convex portions 131 may alternatively be made of a sealing material. When the shapes of the elastic convex portions 131 are set to be capable of completely isolating the first accommodating space 1111 from the second accommodating space 1121, the elastic convex portions 131 each may also be used as a colloid-blocking structure 16, that is, the colloid-blocking structure 16 may be integrated with the elastic convex portions 131, or the colloid-blocking structure 16 may be independent of the elastic convex portions 131.

The elastic convex portions 131 achieve the functions of buffering and telescopic limiting to prevent the support 13 from impacting on the display screen 12 or damaging the cover plate 11. The specific structure and distribution of the elastic convex portions 131 are described by using the structures and distributions in the five implementations shown in FIG. 6 to FIG. 8 and FIG. 13 to FIG. 20 as representatives. However, in the same embodiment, elastic convex portions 131 with different shapes and distributions may be included, and as long as the support 13 can be prevented from impacting on the display screen 12 or damaging the cover plate 11, the technical problem to be resolved by the embodiments of the present application can be resolved. Specifically, the specific structure and distribution of the elastic convex portions 131 are as follows.

In a first implementation, as shown in FIG. 6 to FIG. 8, the support 13 has a ring structure, the support 13 may have the ring structure shown in FIG. 6, and an end of the support 13 may also have a circular ring structure or an oval ring structure or other irregular ring structures. Accordingly, in appearance, the electronic device 10 may have the ring structure shown in FIG. 6, or in a cylindrical shape, an oval shape, or other irregular ring shapes. The elastic concave portions 131 are spherical, a plurality of elastic concave portions 131 are provided, and the plurality of spherical elastic concave portions 131 are distributed at intervals in a wrap-around direction A1 of the support 13 of the ring structure. The elastic concave portions 131 surround the support 13 for at least one round in the wrap-around direction A1 of the ring structure. Specifically, one, two, three or another number of elastic concave portions 131 may be provided, and a gap between the elastic concave portions 131 of adjacent rounds may be set as required. Understandably, the elastic convex portions 131 may alternatively have a spherical deformation structure such as an oval structure, a D-shaped structure, or a C-shaped structure.

It should be noted that FIG. 6 only schematically shows the quantity and distribution of the elastic convex portions 131, and the quantity of the elastic convex portions 131 in each round is not limited to ten, and the quantity of the elastic convex portions 131 in each round may be eight, twelve, fourteen, or the like. Actually, the quantity and distribution of the elastic convex portions 131 in each round may be set as required, and the quantities and distributions of elastic convex portions 131 in different rounds may be the same or different.

The spherical elastic convex portions 131 can bear a greater impact force and achieve the buffering function. The plurality of elastic convex portions 131 are disposed at intervals, and a gap between adjacent elastic convex portions 131 provides a space for extension and retraction of the elastic convex portions 131, which can effectively release the impact force received.

In a specific implementation, the elastic convex portions 131 may be distributed at equal intervals in the wrap-around direction A1 of the support 13 of the ring structure. Distribution at equal intervals means that straight-line distances between adjacent elastic convex portions 131 are equal. Referring to FIG. 6, straight-line distances L1 and L2 between two adjacent elastic convex portions 131 are equal. In this implementation, the distances between the adjacent elastic convex portions 131 are defined as being equal, so that a plurality of elastic convex portions 131 are uniformly distributed in the wrap-around direction A1 of the ring structure. The uniformly distributed elastic convex portions 131 make the structure of the support 13 in a circumferential direction (that is, the wrap-around direction A1) symmetrical, which facilitates assembly and positioning, and can improve assembly efficiency.

It should be noted that, the elastic convex portions 131 may alternatively be distributed irregularly between the cover plate 11 and the support 13. For example, the elastic convex portions 131 are not distributed for one round in the wrap-around direction of the ring structure, or the elastic convex portions 131 are not uniformly distributed at equal intervals, as long as the problem that the support 13 collides with the cover plate 11 and the display screen 12 in the process of assembling the electronic device 10 can be resolved. For example, as shown in FIG. 6, in the electronic device 10 with a curved surface structure, a cover plate 11 generally includes a bent portion 113 and a plate-like portion 114. In a specific implementation, a quantity of elastic convex portions 131 corresponding to the bent portion 113 of the cover plate 11 may be greater than a quantity of elastic convex portions 131 corresponding to the plate-like portion 114 of the cover plate 11. When the bent portion 113 is subjected to collision, cracks or breakage is more likely to occur. Correspondingly arranging more elastic convex portions 131 on the bent portion 113 can effectively buffer the impact of the support 13 on the bent portion 113 of the cover plate 11 and protect the cover plate 11.

In a specific implementation, the cover plate 11 may be provided with grooves (not shown in the figure) matching the shapes of the spherical elastic convex portions 131. When the support 13 provided with the elastic convex portions 131 is aligned with the cover plate 11, local elastic convex portions 131 may be clamped in the grooves to position the support 13 and the cover plate 11. In addition, that the local elastic convex portions 131 are located in the grooves can prevent relative shaking of the cover plate 11 and the support 13 which affects structural stability of the electronic device 10.

Referring to FIG. 6 and FIG. 7, the spherical elastic convex portions 131 are distributed at intervals, that is, a gap is provided between the elastic convex portions 131. In the process of colloid injection, the colloid 136 with good fluidity can flow through the gap between the adjacent elastic convex portions 131 to fill the second accommodating space 1121, so that a high connection strength between the support 13 and the cover plate 11 is fixed, thereby preventing the shaking of the support 13 and the cover plate 11 from leading to poor structural stability of the electronic device 10. In addition, to quickly fill the second accommodating space 1121 with the colloid 136, the spherical elastic convex portions 131 may be further provided with colloid injection holes 143, so that the colloid 136 may not only flow through the gap between the adjacent elastic convex portions 131, but also flow through the colloid injection holes 143 to fill the second accommodating space 1121.

Referring to FIG. 6 and FIG. 7, a length of each colloid injection hole 143 in an axial direction A2 should not be excessively large, that is, a diameter of each spherical elastic convex portion 131 should not be excessively large, otherwise, the colloid easily blocks the colloid injection hole 143 when passing through the longer colloid injection hole 143. A size of the colloid injection hole 143 in a radial direction A3 should not be excessively small, otherwise, the colloid easily blocks the colloid injection hole 143 when passing through the thinner colloid injection hole 143. The colloid injection hole 143 needs to run through the spherical elastic convex portion 131 in the axial direction A2, and the size of the colloid injection hole 143 in the axial direction A2 is related to the size of the elastic convex portion 131 in the axial direction A2. The specific size of the colloid injection hole 143 in the radial direction A3 needs to be determined according to the fluidity of the colloid. If a colloid has better fluidity, the size of the colloid injection hole 143 in the radial direction A3 may not be set excessively large, so that the colloid may still smoothly pass through the colloid injection hole 143. If a colloid has poorer fluidity, the size of the colloid injection hole 143 needs to be set larger in the radial direction A3, so as to effectively prevent the colloid from blocking the colloid injection hole 143. An inner wall of the colloid injection hole 143 is smooth, to prevent the colloid from blocking the colloid injection hole 143.

A quantity of colloid injection holes 143 provided in each spherical elastic convex portion 131 is not limited, and may be one, two, three, or the like. It should be noted that when it is ensured that the colloid can smoothly flow through the colloid injection holes 143 and fill the second accommodating space 1121, the colloid injection holes 143 in each elastic convex portion 131 should not be excessive and the size should not be excessively large. When the colloid injection holes 143 in each elastic convex portion 131 are excessive and the size is excessively large, a smaller force may cause a larger deformation of the elastic convex portion 131, so that the support 13 may impact on the cover plate 11 and the display screen 12, and the buffering effect on the impact force generated by the support 13 is affected.

In a second implementation, as shown in FIG. 13 to FIG. 16, when the elastic convex portions 131 each have a U-shaped structure, open ends 131 of the U-shaped structures may face different directions, as long as the U-shaped structures can elastically abut between the cover plate 11 and the support 13 to achieve a telescopic limiting function and prevent the support 13 from impacting on the display screen 12 and the cover plate 11. Specifically, the open end 1311 of the U-shaped structure may face the cover plate 11 (see FIG. 13), or the open end 1311 of the U-shaped structure faces the support 13 (see FIG. 14), or the open end 1311 of the U-shaped structure faces the display screen 12 (see FIG. 15), or the open end 1311 of the U-shaped structure faces away from the display screen 12 (see FIG. 16). The elastic convex portions 131 with the U-shaped structure may be distributed for one, two or three or another number of rounds in the wrap-around direction of the support 13.

In the same implementation, a U-shaped structure with an open end 1311 facing the cover plate 11 and a U-shaped structure with an open end 1311 facing the support 13 may alternatively be included, or a U-shaped structure with an open end 1311 facing the display screen 12 and a U-shaped structure with an open end 1311 that faces away from the display screen 12 are included.

Each elastic convex portion 131 with the U-shaped structure includes a first mounting portion 1315, a bent portion 1316, and a second mounting portion 1317 that are connected in sequence, where the first mounting portion 1315 and the second mounting portion 1317 are oppositely disposed, and the bent portion 1316 is disposed opposite to the open end 1311 of the U-shaped structure. Each elastic convex portion 131 with the U-shaped structure has an excellent elastic deformation capability, and can effectively buffer an impact force of the support 13 on the cover plate 11. A space surrounded by the first mounting portion 1315, the bent portion 1316, and the second mounting portion 1317 of the elastic convex portion 131 with the U-shaped structure may be filled with a colloid, which increases the elastic deformation capability of the elastic convex portion 131 with the U-shaped structure, and also effectively enhances a connection strength between the support 13 and the cover plate 11.

Figure 13:
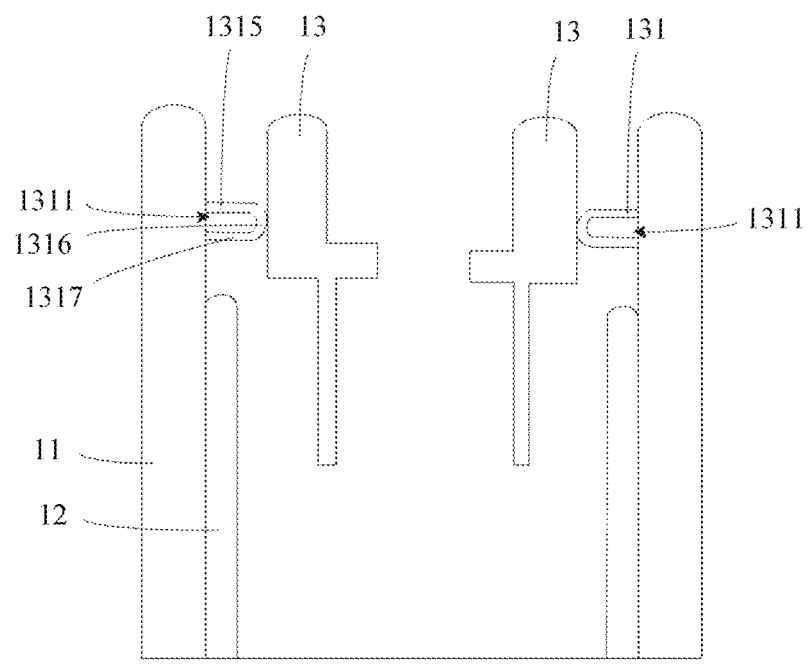
FIG. 13 is a schematic diagram of a structure and distribution of an elastic convex portion according to an embodiment of the present application.

Referring to FIG. 13, when the open end 1311 of the elastic convex portion 131 with the U-shaped structure faces the cover plate 11, the first mounting portion 1315 is disposed away from the display screen 12, and the second mounting portion 1317 is disposed adjacent to the display screen 12. Colloid injection holes (not shown in FIG. 13) may be provided in the first mounting portion 1315 and the second mounting portion 1317, so that the colloid may flow to an inner space of the elastic convex portion 131 with the U-shaped structure through the colloid injection holes in the first mounting portion 1315, and then flow, through the colloid injection holes in the second mounting portion 1317, to one side of the elastic convex portion 131 with the U-shaped structure facing the display screen to surround the elastic convex portion 131 with the U-shaped structure, so as to increase the connection strength between the support 13 and the cover plate 11. Alternatively, referring to FIG. 14, when the open end 1311 of the elastic convex portion 131 with the U-shaped structure faces the support 13, the first mounting portion 1315 is disposed away from the display screen 12, and the second mounting portion 1317 is disposed adjacent to the display screen 12. Similarly, colloid injection holes (not shown in FIG. 14) may be provided in the first mounting portion 1315 and the second mounting portion 1317. Details are not described herein.

Referring to FIG. 13, when the open end 1311 of the elastic convex portion 131 with the U-shaped structure faces the cover plate 11, the first mounting portion 1315 is disposed away from the display screen 12, and the second mounting portion 1317 is disposed adjacent to the display screen 12. Colloid injection holes (not shown in FIG. 13) may be provided in the first mounting portion 1315 and the second mounting portion 1317, so that the colloid may flow to an inner space of the elastic convex portion 131 with the U-shaped structure through the colloid injection holes in the first mounting portion 1315, and then flow, through the colloid injection holes in the second mounting portion 1317, to one side of the elastic convex portion 131 with the U-shaped structure facing the display screen to surround the elastic convex portion 131 with the U-shaped structure, so as to increase the connection strength between the support 13 and the cover plate 11.

Figure 14:
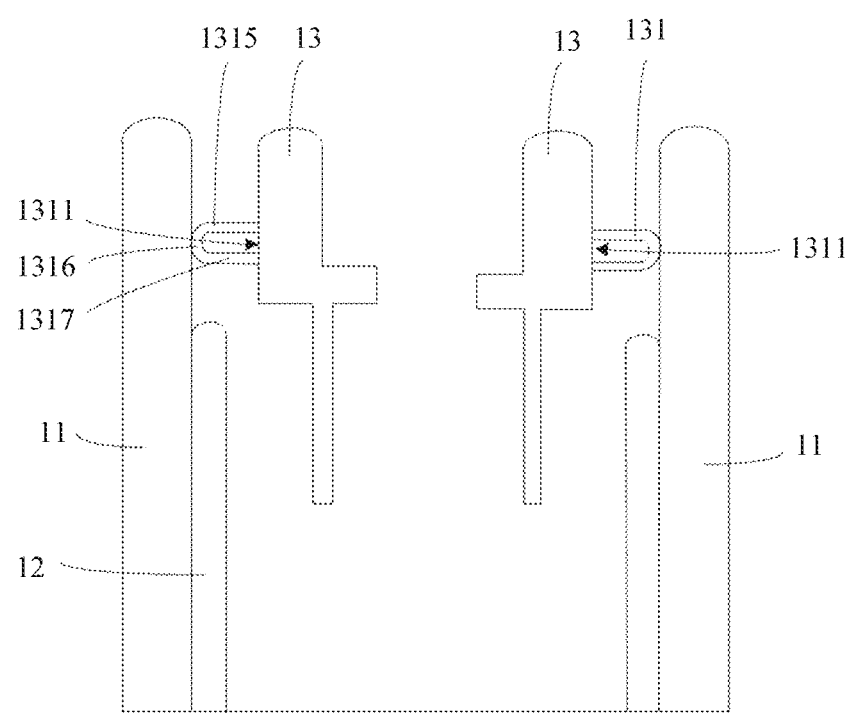
FIG. 14 is a schematic diagram of a structure and distribution of another elastic convex portion according to an embodiment of the present application.
Figure 15:
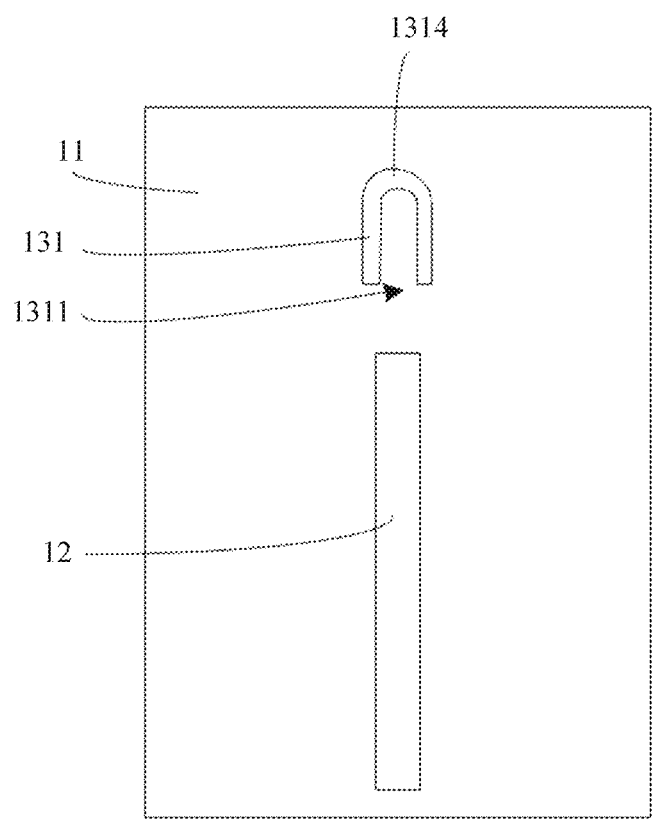
FIG. 15 is a schematic diagram of a structure and distribution of still another elastic convex portion according to an embodiment of the present application.
Figure 16:
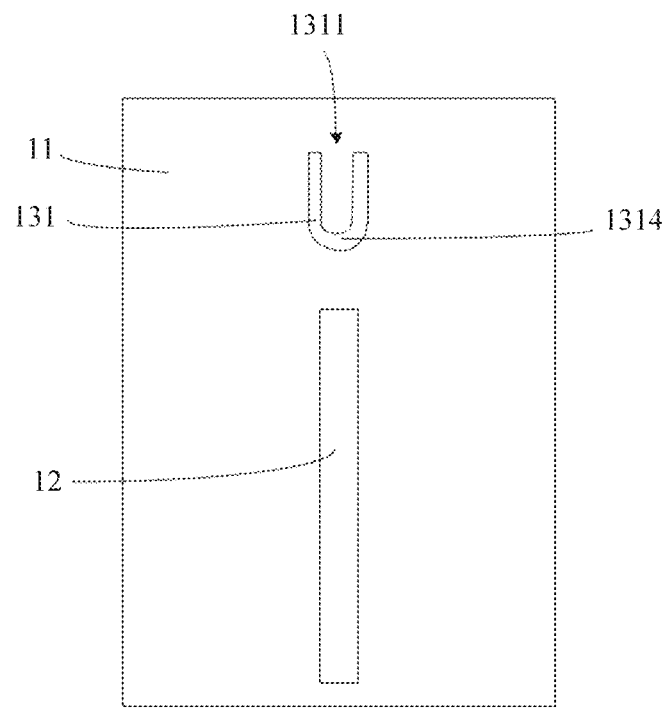
FIG. 16 is a schematic diagram of a structure and distribution of yet another elastic convex portion according to an embodiment of the present application.

Alternatively, referring to FIG. 14, when the open end 1311 of the elastic convex portion 131 with the U-shaped structure faces the support 13, the first mounting portion 1315 is disposed away from the display screen 12, and the second mounting portion 1317 is disposed adjacent to the display screen 12. Similarly, colloid injection holes (not shown in FIG. 14) may be provided in the first mounting portion 1315 and the second mounting portion 1317. Details are not described herein.

Understandably, a distance between the first mounting portion 1315 and the second mounting portion 1317 of the elastic convex portion 131 with the U-shaped structure should not be excessively large, otherwise the strength of the elastic convex portion 131 is insufficient, the structure is unstable, and when subjected to an impact, the elastic convex portion cannot effectively support the support 13 or prevent the support 13 from approaching the cover plate 11 and the display screen 12.

Figure 17:
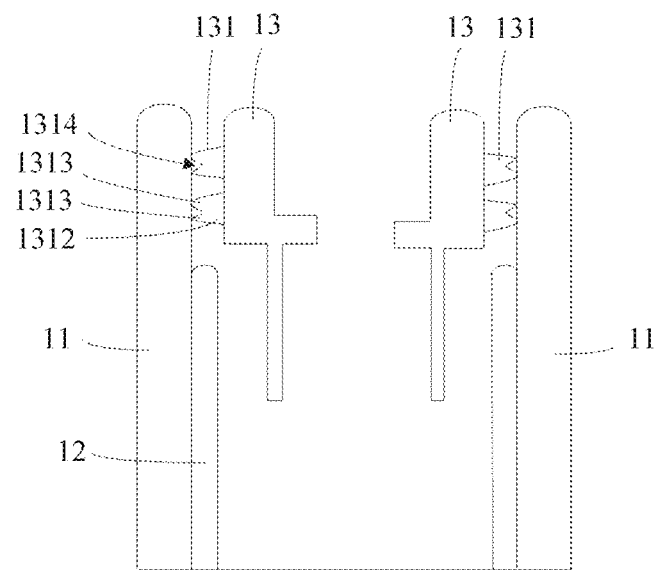
FIG. 17 is a schematic diagram of a structure and distribution of still yet another elastic convex portion according to an embodiment of the present application.

In a third implementation, as shown in FIG. 17, the elastic convex portions 131 each include a fixed portion 1312 and at least two convex hulls 1313 located at one end of the fixed portion 1312, where one end of the fixed portion 1312 away from the convex hulls 1313 is connected to the support 13, a groove 1314 is formed between adjacent convex hulls 1313, and the convex hulls 1313 are in contact with the cover plate 11. The elastic convex portion 131 includes at least two convex hulls 1313, which can increase a contact area between the elastic convex portion 131 and the cover plate 11 and effectively buffer the impact force. The groove 1314 formed between the adjacent convex hulls 1313 increases the space for extension and retraction of the convex hulls 1313, which can effectively release the impact force and reduce the impact force of the support 13 on the cover plate 11. Understandably, the elastic convex portions 131 may be distributed for one, two or three or another number of rounds in the wrap-around direction of the support 13.

To facilitate the filling of the space between the cover plate 11 and the support 13 with the colloid in the colloid injection process, colloid injection holes (not shown in FIG. 17) may be provided in both the fixed portion 1312 and the convex hulls 1313. The colloid may flow, through the colloid injection holes of the fixed portion 1312 and the gap between adjacent elastic convex portions 131, from one side of each elastic convex portion 131 away from the display screen 12 to the other side of the elastic convex portion 131 close to the display screen 12 to surround the elastic convex portion 131, and the colloid may also flow into the groove 1314 between the adjacent convex hulls 1313 through the colloid injection holes in the convex hulls 1313, so as to increase the fixing strength between the cover plate 11 and the support 13.

Figure 18:
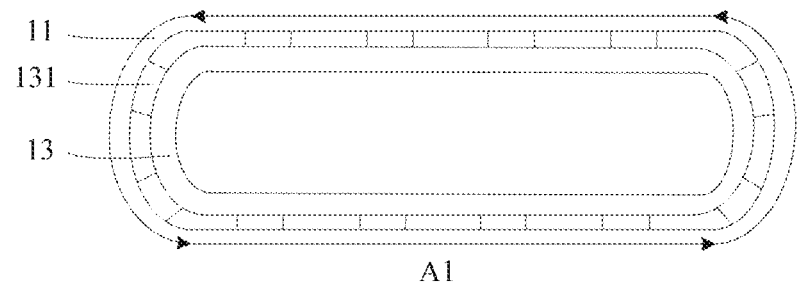
FIG. 18 is a schematic diagram of a structure and distribution of a further elastic convex portion according to an embodiment of the present application.
Figure 19:
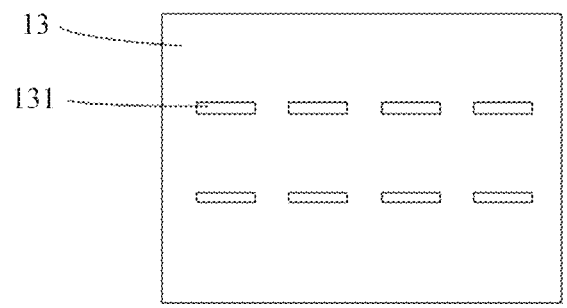
FIG. 19 is a schematic diagram of a structure and distribution of a still further elastic convex portion according to an embodiment of the present application.

In a fourth implementation, as shown in FIG. 18 and FIG. 19, the elastic convex portions 131 each have a strip-shaped structure, and a plurality of strip-shaped structures are disposed at intervals in a wrap-around direction A1 of the support 13. The strip-shaped structure increases the contact area between the elastic convex portion 131 and the cover plate 11 and the support 13, and can effectively buffer the impact force. In addition, it is easy to change the shape of the flexible strip-shaped structure to closely abut against the cover plate 11 and the support 13. Specifically, the elastic convex portion 131 with the flexible strip-shaped structure may be bent into a shape matching the support 13 and the cover plate 11, and abut between the support 13 and the cover plate 11, which can effectively buffer the collision of the support 13 against the cover plate 11. The elastic convex portions 131 with the strip-shaped structure may be distributed for at least one round in the wrap-around direction A1 of the support 13.

In the colloid injection process, the colloid may flow through the gap between the adjacent elastic convex portions 131 with the strip-shaped structure to fill the second accommodating space and increase the fixing strength between the cover plate 11 and the support 13; or colloid injection holes (not shown in FIG. 18 and FIG. 19) may be provided in each elastic convex portion 131 with a strip-shaped structure, so that the colloid may flow, through the colloid injection holes in the elastic convex portion 131 with the strip-shaped structure, from one side of the elastic convex portion 131 away from the display screen to the other side of the elastic convex portion 131 close to the display screen to surround the elastic convex portion 131.

Figure 20:
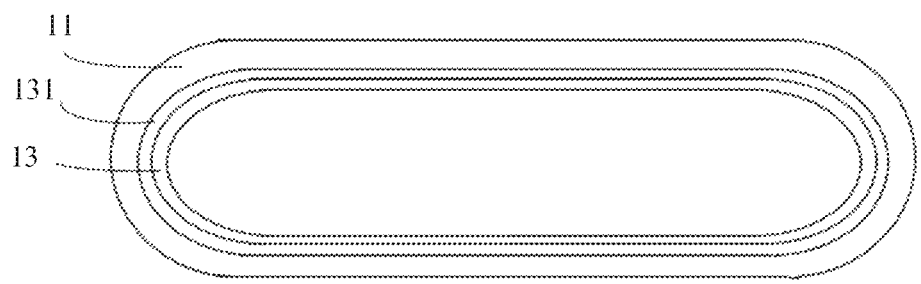
FIG. 20 is a schematic diagram of a structure and distribution of a yet further elastic convex portion according to an embodiment of the present application.

In a fifth implementation, as shown in FIG. 20, the elastic convex portions 131 each have an integrated wrap-around structure, and the elastic convex portions 131 surround on a surface of the support 13 that faces the cover plate 11. Understandably, each elastic convex portion 131 may be an elastic pad, and the elastic pad is sleeved on a periphery of the support 13 and abuts against the surface of the cover plate 11. The elastic convex portions 131 with the integrated wrap-around structure are easy to fix. One, two, three, or another number of elastic convex portions 131 with the integrated wrap-around structure may be provided, and the adjacent elastic pads are distributed at intervals.

Figure 21:
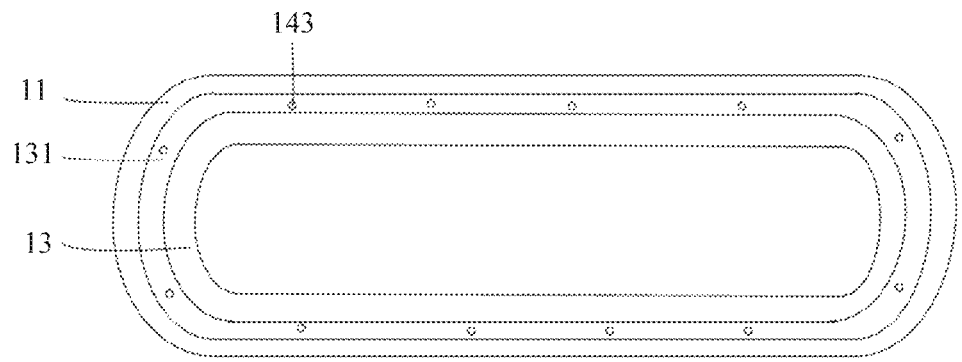
FIG. 21 is a schematic diagram of a structure and distribution of an elastic convex portion provided with colloid injection holes according to an embodiment of the present application.

When the elastic convex portion 131 has an integrated wrap-around structure, for example, is an elastic pad, the elastic convex portion 131 elastically abuts between the cover plate 11 and the support 13, that is, the elastic convex portion 131 is in contact with the cover plate 11, and the elastic convex portion 131 is in contact with the support 13. In this way, in the process of colloid injection, it is difficult for the colloid to continue to flow toward the display screen 12 by using the elastic convex portion 131 with the integrated wrap-around structure to surround the elastic convex portion 131. In other words, it is difficult for the colloid to flow from one side of the elastic convex portion 131 away from the display screen 12 to the other side of the elastic convex portion 131 close to the display screen 12 to surround the elastic convex portion 131, so as to increase the fixing strength between the cover plate 11 and the support 13. Referring to FIG. 21, in a specific implementation, colloid injection holes 143 may be provided in each elastic convex portion 131 with the integrated wrap-around structure, so that the colloid may flow, through the colloid injection holes 143 in the elastic convex portion 131 with the integrated wrap-around structure, from one side of the elastic convex portion 131 away from the display screen 12 to the other side of the elastic convex portion 131 close to the display screen 12 to surround the elastic convex portion 131.

The colloid passing through the colloid injection holes 143 of the elastic convex portion 131 with the integrated wrap-around structure is blocked by the colloid-blocking structure, so that the colloid is prevented from flowing to the display screen. Understandably, when the elastic convex portion 131 and the colloid-blocking structure may be both elastic pads, the elastic concave portion 131 may be provided with colloid injection holes, but the colloid-blocking structure cannot have a pore structure. In addition, in a specific implementation, the thickness of the elastic convex portion 131 is greater than that of the colloid-blocking structure, that is, the size of the elastic convex portion 131 in the axial direction is greater than the size of the colloid-blocking structure in the axial direction. In this way, the strength of the elastic convex portion 131 is greater than the strength of the colloid-blocking structure, and the elastic convex portion 131 can provide a certain supporting force for the cover plate 11 and the support 13, but the colloid-blocking structure only needs to have a good sealing effect, and may be relatively thin and light, thereby facilitating the lightening of the entire electronic device 10.

The specific shape, structure and distribution of the elastic concave portions 131 are not limited to those of the foregoing several implementations, or the foregoing implementations may be used in combination. For example, in the same implementation, spherical elastic concave portions 131 and elastic concave portions 131 with a U-shaped structure may be included, as long as the sizes of the spherical elastic concave portions 131 and the elastic concave portions 131 with the U-shaped structure are controlled to match, so that the spherical elastic concave portions 131 and the elastic concave portions 131 with the U-shaped structure can abut between the cover plate 11 and the support 13. In other words, while the spherical elastic convex portions 131 are in contact with both the cover plate 11 and the support 13, the elastic convex portions 131 with the U-shaped structure are also in contact with both the cover plate 11 and the support 13. In other implementations, spherical elastic convex portions 131, elastic convex portions 131 with a U-shaped structure, elastic convex portions 131 with a strip-shaped structure, and the like may alternatively be included, as long as the elastic convex portions 131 with different structures can abut between the cover plate 11 and the support 13.

The elastic convex portions 131 each may be fixedly connected to the support 13, and one end of each of the elastic convex portions 131 away from the support 13 elastically abuts against the cover plate 11; or the elastic convex portions 131 are each fixedly connected to the cover plate 11, and one end of each of the elastic convex portions 131 away from the cover plate 11 elastically abuts against the support 13. When the elastic convex portions 131 are each fixedly connected to the support 13 or the cover plate 11, different connection methods may be provided, specifically:

when the elastic convex portions 131 are each fixedly connected to the support 13, each elastic convex portion 131 and the support 13 may be integrally formed, or may have an assembled structure. The support 13 may be made of plastic, and the elastic convex portion 131 may be made of a material with a good elastic deformation capability, such as rubber, silica gel, or foam, or the elastic convex portion 131 is a spring, an elastic metal sheet, or the like, as long as the elastic convex portion can buffer the impact force of the support 13 on the cover plate 11. With rubber as an example, when the elastic convex portion 131 and the support 13 have an assembled structure, the support 13 may be provided with a clamping groove, the elastic convex portion 131 made of rubber is provided with a clamping block, and the clamping block of the elastic convex portion 131 is clamped in the clamping groove of the support 13 to form an integrated structure, or the elastic convex portion 131 made of rubber is bonded to the support 11 by using a colloid. When the elastic concave portion 131 is a spring or an elastic metal sheet, the elastic concave portion may alternatively be fixed to the support 13 through gluing.

Figure 22:
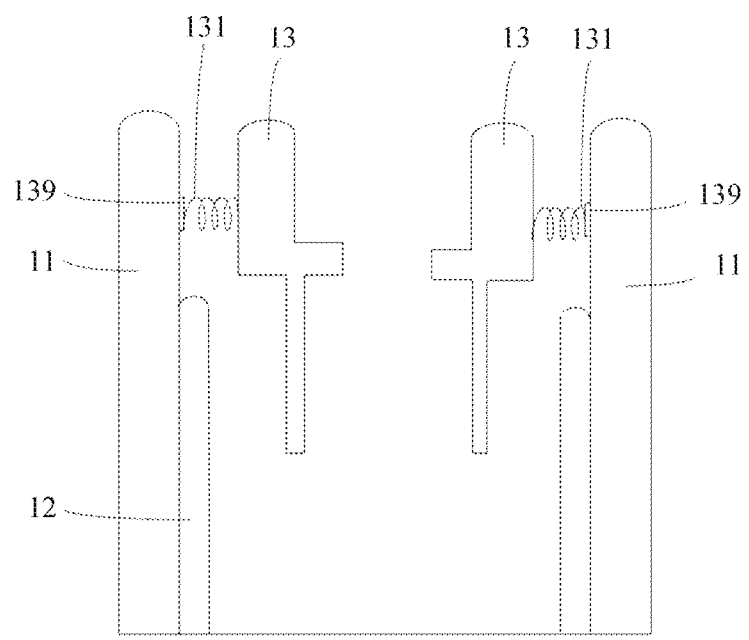
FIG. 22 is a schematic diagram of a structure and distribution of a still yet further elastic convex portion according to an embodiment of the present application.

Referring to FIG. 22, when the elastic convex portion 131 is a spring or an elastic metal sheet, a direct contact between the elastic convex portion 131 and the cover plate 11 may damage the cover plate 11. A protective layer 139 may be disposed on the surface of the cover plate 11, so that the elastic convex portion 131 is in contact with the protective layer 139 to prevent the cover plate 11 from being scratched by the elastic convex portion 131. The protective layer 139 may be made of rubber, silica gel, foam, or the like. The protective layer 139 may be fixed to the cover plate 11 through gluing.

Figure 23:
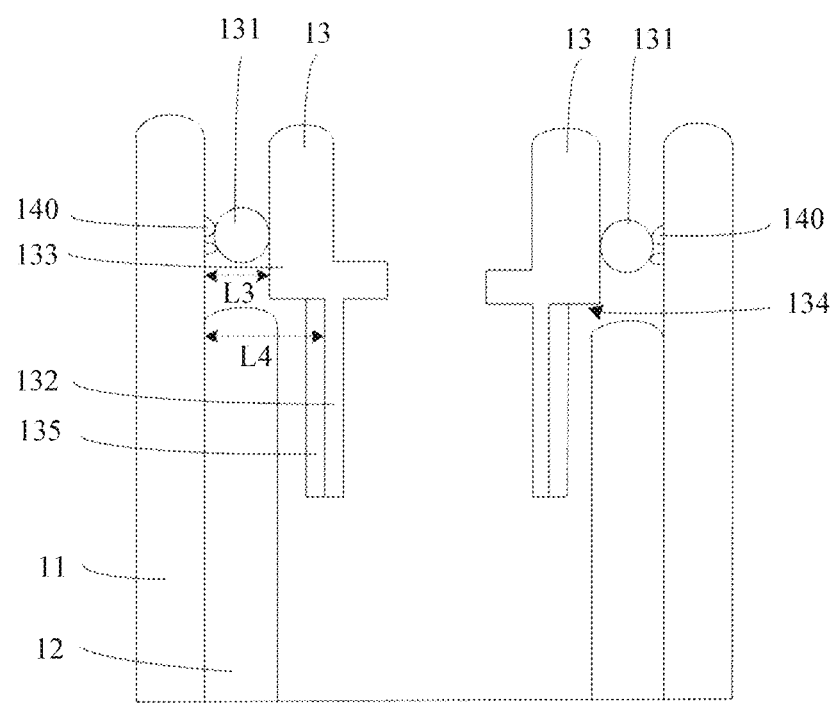
FIG. 23 is a schematic diagram of a cover plate provided with a rough structure according to an embodiment of the present application.

Referring to FIG. 23, when the elastic concave portion 131 is fixedly connected to the support 13, a rough structure 140 may be disposed on the surface of the cover plate 11, and the elastic concave portion 131 is in contact with the rough structure 140. The rough structure 140 may be a textured structure or a granular structure to increase surface roughness of the cover plate 11, so that when the elastic concave portion 131 is in contact with the cover plate 11, a relatively large friction force may be generated between the elastic concave portion and the cover plate 11, to prevent the support 13 fixedly connected to the elastic concave portion 131 from sliding relative to the cover plate 11 in the assembly process, which improves structural stability of the electronic device 10 in the assembly process.

When the elastic convex portions 131 are each fixedly connected to the cover plate 11, each elastic convex portion 131 and the cover plate 11 may have an assembled structure. The cover plate 11 may be made of glass. The elastic convex portion 131 may be bonded to the cover plate 11 by using a colloid, or the elastic convex portion 131 is viscous, and the elastic convex portion 131 is bonded to the cover plate 11 by using its own viscosity to form an integrated structure. During assembly, the cover plate 11 to which the elastic convex portion 131 is fixed is aligned with the support 13, and the elastic convex portion 131 abuts against the surface of the support 13. The elastic convex portion 131 may also form an assembled structure with the cover plate 11 or the support 13 by using other connection methods, and no limitation is imposed in the present application.

Understandably, when the elastic convex portion 131 is fixedly connected to the surface of the cover plate 11 facing the support 13, because the surface of the cover plate 11 facing the support 13 is enclosed to form a curved space, it is inconvenient to fix the elastic convex portion 131. When the elastic convex portion 131 is fixedly connected to the surface of the support 13 facing the cover plate 11, it is convenient to operate and easy to fix the elastic convex portion, and fixation efficiency is high, which improves assembly efficiency of the electronic device 10.

In a specific embodiment, as shown in FIG. 23, the support 13 includes a connection portion 132 and a support portion 133, where the support portion 133 is located between an edge of the support 13 and the connection portion 132, the display screen 12 is located between the cover plate 11 and the connection portion 132, the elastic convex portions 131 are located between the cover plate 11 and the support portion 133, and a vertical distance L3 between the support portion 133 and the cover plate 11 is less than a vertical distance L4 between the connection portion 132 and the cover plate 11. In other words, a gap between the support portion 133 and the cover plate 11 is smaller than a gap between the connection portion 132 and the cover plate 11. This may make the size of the elastic concave portion 131 abutting between the support portion 133 and the cover plate 11 smaller, and prevent the gap between the support portion 133 and the cover plate 11 from being excessively large. If the size of the elastic concave portion 131 is excessively large, the cover plate 11 and the support 13 are prone to dislocation during impacting or shaking, which affects structural stability of the electronic device 10.

The support portion 133 and the connection portion 132 form a stepped surface 134, and a gap is provided between an end face of the display screen 12 and the stepped surface 134. This can prevent the support 13 from impacting on the display screen 12 when the position of the support 13 is relatively unfixed in the assembly process.

Referring to FIG. 23, to prevent the support 13 from impacting on the display screen 12, a buffer layer 135 may be further disposed between the connection portion 132 of the support 13 and the display screen 12, and the buffer layer 135 is located on a surface of the connection portion 132 facing the display screen 12. The buffer layer 135 may be fixed to the connection portion 132 through gluing, and an end face of the buffer layer 135 abuts against the stepped surface 134. The buffer layer 135 may be made of foam, and the foam is light in weight, good in elasticity, and easy to process in shape, which can reduce the weight of the entire electronic device 10 and achieve the lightening of the electronic device 10. During the impact, the buffer layer 135 is first in contact with the display screen 12, and the buffer layer 135 has a good deformation capability. The buffer layer 135 can buffer the impact force of the support 13 on the display screen 12, and the buffer layer 135 can prevent the support 13 from being in direct contact with the display screen 12, thereby effectively reducing the impact of the support 13 on the display screen 12. Specifically, the support 13 usually has certain supporting hardness, and the direct collision and contact between the support 13 and the display screen 12 easily damages the display screen 12. The buffer layer 135 usually has good elasticity, and when coming into collision and contact with the display screen 12, the buffer layer 135 can be compressed to avoid damaging the display screen 12.

It should be noted that the buffer layer 135 may be in contact with the surface of the display screen 12, but no overpressure should occur between the buffer layer 135 and the display screen 12, that is, the buffer layer 135 and the display screen 12 cannot be pressed tightly against each other, to prevent the display screen 12 from being damaged in case of overpressure. In other implementations, a gap may alternatively be provided between the buffer layer 135 and the display screen 12. When the electronic device 10 is subjected to collision, the buffer layer 135 approaches the display screen 12 and releases a received collision force.

Figure 24:
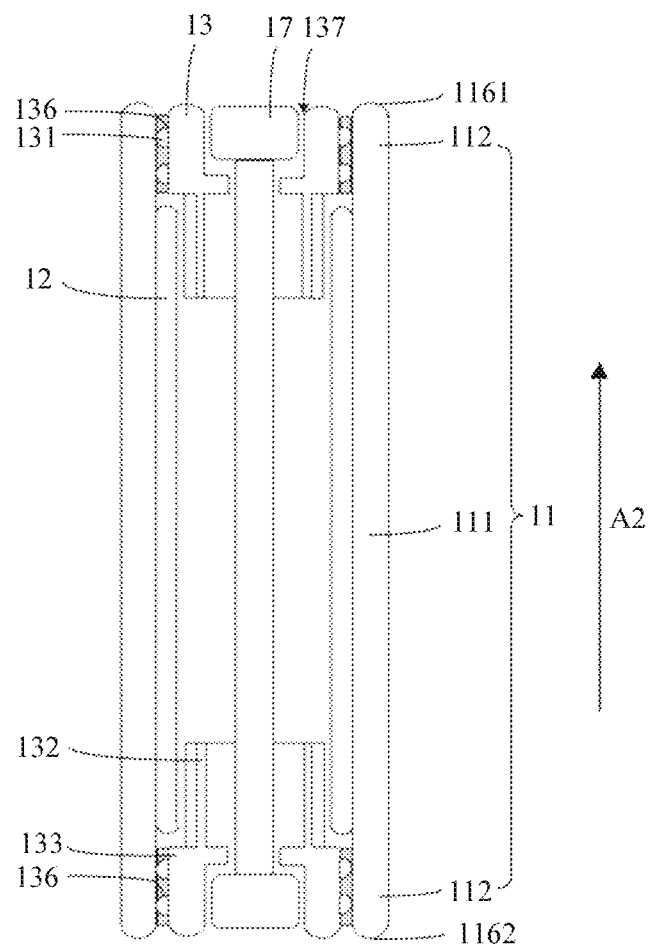
FIG. 24 is a sectional view of an entire electronic device according to an embodiment of the present application.

As shown in FIG. 24, FIG. 24 is a sectional view of an entire electronic device. Two second regions 112 are provided, one second region 112 is located between the first edge 1161 and the first region 111, and the other second region 112 is located between the second edge 1161 and the first region 111. In other words, the two second regions 112 are located at two ends of the first region 111 respectively, and elastic convex portions 131 may be disposed between the two second regions 112 and the support 13, so that a fixing strength between the cover plate 11 and the support 13 is increased, and structural stability of the electronic device 10 is enhanced. Shapes and distributions of the elastic convex portions 131 at two ends of the electronic device may be the same or different, and no limitation is imposed in the present application.

A middle frame 17 is mounted on the electronic device 10. Specifically, the support 13 is internally provided with a through hole 137, the through hole 137 extends in the axial direction A2, and the middle frame 17 passes through the through hole 137 and is fixedly connected to the support 13. A main board, a battery, an antenna (not shown in FIG. 24), and the like are mounted on the middle frame 17 to implement functionalization of the electronic device 10. The display screen 12 is electrically connected to the main board. The display screen 12 may be an organic light-emitting diode, and the main board is provided with a driving unit to drive the display screen 12 to display.

Understandably, referring to FIG. 24, when the cover plate 11 and the display screen 12 have an integrated 360° wrap-around structure, the display screen 12 is attached to an inner surface of the cover plate 11, and the support 13 passes through a cavity enclosed by the cover plate 11 and the display screen 12 in the axial direction A2, and extends from one end of the cover plate 11 to the other end of the cover plate 11. Specifically, to prevent one end of the support 13 from interfering with the display screen 12 and impacting on the display screen 12 when the support 13 passes through the cavity enclosed by the cover plate 11 and the display screen 12 in the axial direction A2, the support portion 133 of the support 13 may be provided with an avoidance slot (not shown in FIG. 24), and the avoidance slot matches the display screen 12, so that when passing in the axial direction A2, the support 13 does not interfere with the display screen 12 and avoids impacting on the display screen. 12. The integrated cover plate 11 and the integrated display screen 12 have good display quality, which avoids a problem of poor display at a splicing part of a split display screen 12 during assembly.

Referring to FIG. 3 and FIG. 24, when the display screen 12 has a split 360° wrap-around structure, the cover plate 11 may also be set to a split 360° wrap-around structure. The first display portion 121 of the display screen 12 is connected to a corresponding portion of the cover plate 11, and the second display portion 122 of the display screen 12 is connected to a corresponding portion of the cover plate 11. The support 13 is mounted in an open space enclosed by the first display portion 121, and the second display portion 122 and the corresponding portion of the cover plate 11 block the opening of the space. The cover plate 11 with the split structure and the display screen 12 with the split structure are easy to assemble.

In other embodiments, the display screen 12 has an integrated structure, and the cover plate 11 may have a split 360° wrap-around structure. For example, the cover plate 11 includes a first portion and a second portion, and the two portions are detachably connected. During installation, the display screen 12 is installed to part of the cover plate 11. For example, the display screen 12 is assembled to the first portion of the cover plate 11. Then the support 13 is installed in a wrap-around space of the cover plate 11, and then the second portion of the cover plate 11 is fixedly connected to the first portion. In this way, the support 13 is accommodated in the wrap-around space of the cover plate 11.

In the present application, the elastic convex portions 131 are disposed between the cover plate 11 and the support 13, so that the support 13 is prevented from impacting on the cover plate 11 in the assembly process, and the assembly yield of the electronic device 10 is improved. In the present application, a colloid is dispensed between the second region 112 of the cover plate 11 and the support 13 for fixation, which prevents relative shaking of the cover plate 11 and the support 13, increases concentricity of the cover plate 11 and the support 13, and improves appearance refinement and structural stability of the electronic device 10. In addition, in the present application, the buffer layer 135 is disposed between the display screen 12 and the support 13. The buffer layer 135 has good elasticity, and the buffer layer 135 can buffer the impact force of the support 13 on the display screen 12. When coming into collision and contact with the display screen 12, the buffer layer 135 can be compressed to avoid damaging the display screen 12.

The above are preferred implementations of the present application, and it should be noted that a person of ordinary skill in the art may further make several improvements and retouchings without departing from the principles of the present application. These improvements and retouchings should be also considered as falling within the protection scope of the present application.

What is claimed is:

1. An electronic device, comprising:
    a support comprising a ring structure;
    a cover plate comprising a first region and second regions, wherein each of the second regions is located between an edge of the cover plate and the first region;
    a display screen, wherein the cover plate and the display screen are stacked and disposed around the support, wherein the display screen is located between the first region and the support; and
    spherical elastic convex portions that are disposed between the second region and the support,
    wherein each elastic convex portion elastically abuts between the second region and the support, and
    wherein a plurality of elastic convex portions are distributed at intervals in a wrap-around direction of the ring structure.

2. The electronic device of claim 1, wherein the cover plate surrounds to form a cylindrical enclosing space, and wherein the support is accommodated in the enclosing space.

3. The electronic device of claim 1, wherein the cover plate surrounds to form a cylindrical structure, wherein the cover plate comprises two open ends, wherein a direction in which the two open ends are arranged is an axial direction, and wherein the first region, at least one of the second regions, and the edge of the cover plate are arranged in sequence in the axial direction.

4. The electronic device of claim 3, wherein in the axial direction, the edge of the cover plate comprises a first edge and a second edge disposed opposite to each other, two second regions are provided, one of the two second regions is located between the first edge and the first region, and the other of the two second regions is located between the second edge and the first region.

5. The electronic device of claim 4, further comprising a first covering member and a second covering member, wherein the first covering member is connected to the first edge, and the second covering member is connected to the second edge.

6. The electronic device of claim 4, further comprising an in-screen camera and an in-screen fingerprint, wherein the in-screen camera is located at a position of the display screen adjacent to the first edge, and the in-screen fingerprint is located at a position of the display screen adjacent to the second edge.

7. The electronic device of claim 1, wherein the elastic convex portions are distributed at equal intervals in the wrap-around direction of the ring structure.

8. The electronic device of claim 1, wherein each of the elastic convex portions has a U-shaped structure, and wherein an open end of the U-shaped structure faces the cover plate, or the open end of the U-shaped structure faces the support, or the open end of the U-shaped structure faces the display screen, or the open end of the U-shaped structure faces away from the display screen.

9. The electronic device of claim 1, wherein each of the elastic convex portions comprises a fixed portion and at least two convex hulls located at one end of the fixed portion, wherein one end of the fixed portion away from the convex hulls is connected to the support, wherein a groove is formed between adjacent convex hulls, and wherein the convex hulls are in contact with the cover plate.

10. The electronic device of claim 1, wherein each of the elastic convex portions has a strip-shaped structure, and wherein a plurality of strip-shaped structures are disposed at intervals in a wrap-around direction of the support.

11. The electronic device of claim 1, wherein each of the elastic convex portions has an integrated wrap-around structure, and wherein the elastic convex portions surround on a surface of the support that faces the cover plate.

12. The electronic device of claim 1, wherein each of the elastic convex portions is fixedly connected to the support, and one end of each of the elastic convex portions away from the support elastically abuts against the cover plate.

13. The electronic device of claim 12, wherein a surface of the cover plate is provided with a protective layer, and wherein the protective layer is in contact with the elastic convex portions.

14. The electronic device of claim 12, wherein the surface of the cover plate is provided with a rough structure, and wherein the elastic convex portions are in contact with the rough structure.

15. The electronic device of claim 1, wherein each of the elastic convex portions is fixedly connected to the cover plate, and one end of each of the elastic convex portions away from the cover plate elastically abuts against the support.

16. The electronic device of claim 1, wherein the support comprises a connection portion and a support portion, wherein the support portion is located between an edge of the support and the connection portion, wherein the display screen is located between the cover plate and the connection portion, wherein the elastic convex portions are located between the cover plate and the support portion, and wherein a vertical distance between the support portion and the cover plate is less than a vertical distance between the connection portion and the cover plate.

17. The electronic device of claim 16, wherein a buffer layer is disposed between the connection portion and the display screen, and wherein the buffer layer is located on a surface of the connection portion facing the display screen.

18. The electronic device of claim 1, wherein a colloid is disposed in a gap between the second region and the support, wherein the colloid surrounds the elastic convex portions, and wherein the colloid is fixedly connected to the cover plate and the support.

19. The electronic device of claim 18, wherein the support is provided with a colloid-blocking structure, wherein a first accommodating space is formed between the support and the first region, wherein a second accommodating space is formed between the support and the second region, wherein the colloid is located in the second accommodating space, wherein the colloid-blocking structure is located at a joint of the first accommodating space and the second accommodating space, and wherein the colloid-blocking structure isolates the first accommodating space from the second accommodating space.

20. The electronic device of claim 19, wherein the colloid-blocking structure has an elastic deformation capability.

* * * * *